(12) United States Patent
Hayakawa et al.

(10) Patent No.: US 9,569,675 B2
(45) Date of Patent: Feb. 14, 2017

(54) THREE-DIMENSIONAL OBJECT DETECTION DEVICE, AND THREE-DIMENSIONAL OBJECT DETECTION METHOD

(71) Applicant: Nissan Motor Co., Ltd., Yokohama-shi, Kanagawa (JP)

(72) Inventors: Yasuhisa Hayakawa, Yokohama (JP); Osamu Fukata, Commerce Township, MI (US)

(73) Assignee: Nissan Motor Co., Ltd., Yokohama (JP)

( * ) Notice: Subject to any disclaimer, the term of this patent is extended or adjusted under 35 U.S.C. 154(b) by 25 days.

(21) Appl. No.: 14/406,807

(22) PCT Filed: Jul. 24, 2013

(86) PCT No.: PCT/JP2013/070009
§ 371 (c)(1),
(2) Date: Dec. 10, 2014

(87) PCT Pub. No.: WO2014/017520
PCT Pub. Date: Jan. 30, 2014

(65) Prior Publication Data
US 2015/0161457 A1 Jun. 11, 2015

(30) Foreign Application Priority Data
Jul. 27, 2012 (JP) .................................. 2012-166515

(51) Int. Cl.
*B60R 1/00* (2006.01)
*B60S 1/56* (2006.01)
(Continued)

(52) U.S. Cl.
CPC ....... *G06K 9/00805* (2013.01); *G06K 9/00798* (2013.01); *G06T 7/0002* (2013.01);
(Continued)

(58) Field of Classification Search
CPC ............... B60R 1/002; B60R 2300/607; B60R 2300/8093; H04N 7/183; B60S 1/56; B60S 1/46
(Continued)

(56) References Cited

U.S. PATENT DOCUMENTS

| 2008/0192984 A1* | 8/2008 | Higuchi | G08G 1/16 382/104 |
| 2011/0310245 A1* | 12/2011 | Tsuchiya | G01S 11/12 348/135 |

FOREIGN PATENT DOCUMENTS

| CN | 101294801 A | 10/2008 |
| CN | 102288165 A | 12/2011 |

(Continued)

*Primary Examiner* — Gims Philippe
*Assistant Examiner* — On S Mung
(74) *Attorney, Agent, or Firm* — Global IP Counselors, LLP

(57) ABSTRACT

A three-dimensional object detection device has an image capturing unit, detection area setting unit, a three-dimensional object detection unit and a lens state assessment unit. The image capturing unit has a lens for capturing images behind a vehicle. The detection area setting unit sets a detection area behind the vehicle. The three-dimensional object detection unit detects a three-dimensional object that is present in the detection area based on the acquired images. The lens state assessment unit detects if the lens is in a wet state. When a determination is made by that the lens is in a wet state, the detection area setting unit changes a position of the detection area from a first detection area, which is first set as the detection area to a second detection area, in which a display area for a driving lane marker on a driving lane side of the vehicle is removed.

9 Claims, 28 Drawing Sheets

(51) Int. Cl.
| | |
|---|---|
| *B60S 1/46* | (2006.01) |
| *H04N 7/18* | (2006.01) |
| *G06K 9/00* | (2006.01) |
| *G06T 7/00* | (2006.01) |
| *G08G 1/16* | (2006.01) |
| *H04N 13/00* | (2006.01) |
| *H04N 13/02* | (2006.01) |

(52) U.S. Cl.
CPC ............ *G08G 1/166* (2013.01); *G08G 1/167* (2013.01); *H04N 13/0007* (2013.01); *H04N 13/0296* (2013.01); *G06T 2207/10016* (2013.01); *G06T 2207/30168* (2013.01); *G06T 2207/30252* (2013.01); *G06T 2207/30256* (2013.01)

(58) Field of Classification Search
USPC .......................................................... 348/46
See application file for complete search history.

(56) References Cited

FOREIGN PATENT DOCUMENTS

| | | |
|---|---:|---|
| EP | 1962254 A2 | 8/2008 |
| JP | 2008-197863 A | 8/2008 |
| JP | 2008-219063 A | 9/2008 |
| JP | 2008-227646 A | 9/2008 |
| JP | 2009-145065 A | 7/2009 |
| JP | 2010-256995 A | 11/2010 |
| JP | 2012-3662 A | 1/2012 |
| JP | WO 2012023412 A1 * 2/2012 ............... G06T 3/00 |

* cited by examiner

THREE-DIMENSIONAL OBJECT DETECTION DEVICE, AND THREE-DIMENSIONAL OBJECT DETECTION METHOD

CROSS-REFERENCE TO RELATED APPLICATIONS

This application is a U.S. National stage application of International Application No. PCT/JP2013/070009, filed Jul. 24, 2013, which claims priority to Japanese Patent Application No. 2012-166515 filed in Japan on Jul. 27, 2012. The entire disclosure of Japanese Patent Application No. 2012-166515 is hereby incorporated herein by reference.

BACKGROUND

Field of the Invention

The present invention relates to a three-dimensional object detection device and a three-dimensional object detection method.

Background Information

In a known obstacle detection device, captured images of a vehicle's surroundings are converted into a bird's-eye view, and an obstacle is detected using the differences between two converted bird's-eye view images captured at different times (see Japanese Laid-Open Patent Application No. 2008-227646).

SUMMARY

When detecting another vehicle driving in an adjacent lane of a driving lane of a host vehicle as an obstacle using an image that has captured the rear of the vehicle, if water adheres to the lens and the lens is wet, the image of the white line, which is a driving lane marker on the road, will be distorted; therefore, there is a problem that the image of the distorted white line will be erroneously misidentified as an image of another vehicle driving in the adjacent lane.

The problem to be solved by the present invention is to provide a three-dimensional object detection device and a three-dimensional object detection method that are able to detect another vehicle driving in an adjacent lane with a high degree of precision by preventing an erroneous detection of an image of a white line that is captured when the lens is wet as another vehicle that is driving in an adjacent lane that is adjacent to the driving lane of a host vehicle.

When a determination is made that the lens is in a wet state, the present invention solves the problem by changing the position of a first detection area that is first set as a detection area, so that this area does not include a display area for a driving lane marker on the driving lane side of the vehicle of the driving lane markers on the adjacent lane, which is adjacent to the lane in which the vehicle drives, and setting a second detection area.

When a determination is made that the lens is in a wet state, the present invention changes the position of a first detection area, which is first set as the detection area, along the vehicle width direction and sets a second detection area in which a display area of a driving lane marker on driving lane side of the vehicle among the driving lane markers in the adjacent lanes that are adjacent to the lane in which the vehicle drives is removed; therefore, preventing the driving lane marker on the adjacent lane from being included in the detection area is possible, and preventing an errant detection of a distorted driving lane marker that is captured using the wet lens as another vehicle that is driving in an adjacent lane that is adjacent to the driving lane of a host vehicle is possible. As a result, providing a three-dimensional object detection device that detects another vehicle that drives in an adjacent lane that is adjacent to the driving lane of the host vehicle with high degree of precision is possible.

BRIEF DESCRIPTION OF THE DRAWINGS

Referring now to the attached drawings which form a part of this original disclosure.

DETAILED DESCRIPTION OF THE EMBODIMENTS

Figure 1:
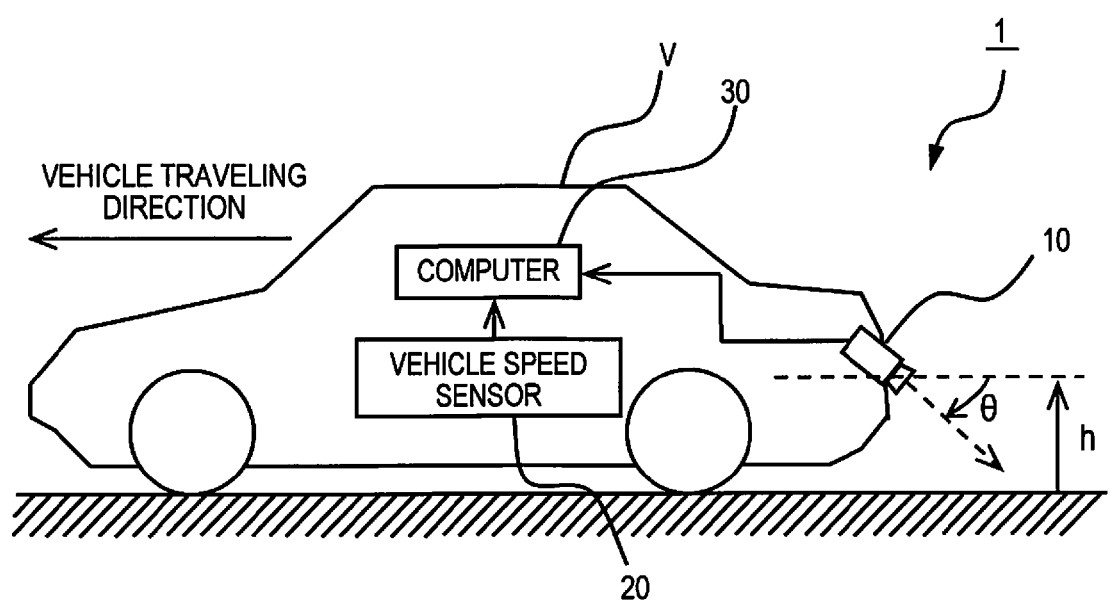
FIG. 1 is a schematic overview of a vehicle according to one embodiment to which the three-dimensional object detection device of the present invention has been applied.

FIG. 1 is a schematic overview of a vehicle according to one embodiment to which the three-dimensional object detection device 1 of the present invention is applied; the three-dimensional object detection device 1 of the present example is a device for detecting another vehicle, to which a driver of a host vehicle V should pay focus while driving, for example, another vehicle where contact is possible should the host vehicle V change lanes, as an obstacle. In particular, the three-dimensional object detection device 1 of the present example detects another vehicle that is driving in an adjacent lane that is adjacent to the lane in which the host vehicle is driving (hereinafter also referred to simply as the adjacent lane). Also, the three-dimensional object detection device 1 of the present example is able to calculate the travel distance and traveling speed of the other vehicle that is detected. Accordingly, in the example described below, an example will be illustrated in which the three-dimensional object detection device 1 is mounted to a host vehicle V, and of the three-dimensional objects detected in the host vehicle's surroundings, another vehicle that is driving in an adjacent lane that is adjacent to the lane in which the host vehicle is driving is detected. As illustrated in the drawing, the three-dimensional object detection device 1 of the present example is provided with a camera 10, a vehicle speed sensor 20, a computer 30, a raindrop sensor 50, a wiper 60, a navigation device 70 comprising a communication device 71 and a GPS device 72, and a lens cleaning device 80.

The camera 10 is attached to the host vehicle V so that the optical axis is an angle θ downward from the horizon in a location at a height h at the rear of the host vehicle V, as illustrated in FIG. 1. From this position, the camera 10 captures a predetermined area of the surrounding environment of the host vehicle V. There is one camera 10 that is provided for detecting a three-dimensional object at the rear of the host vehicle V in the present embodiment, but other cameras can be provided for other uses, for example, for obtaining an image of the vehicle's surroundings. The vehicle speed sensor 20 detects the driving speed of the host vehicle V and calculates the vehicle speed from a wheel speed detected by, for example, a wheel speed sensor for detecting the rotational speed of a wheel. The computer 30 detects a three-dimensional object at the rear of the vehicle and in the present example, calculates the travel distance and the traveling speed of the three-dimensional object. The raindrop sensor 50, the wiper 60, the navigation device 70, and the lens cleaning device 80 detect the presence/absence of raindrops that have adhered to the host vehicle V, the amount of the raindrops, the presence/absence of cleaning liquid that has adhered to the lens 11, and the amount of the cleaning liquid and send the detection results to an assessment unit 38 mentioned below. Each device will be described in detail below.

Figure 2:
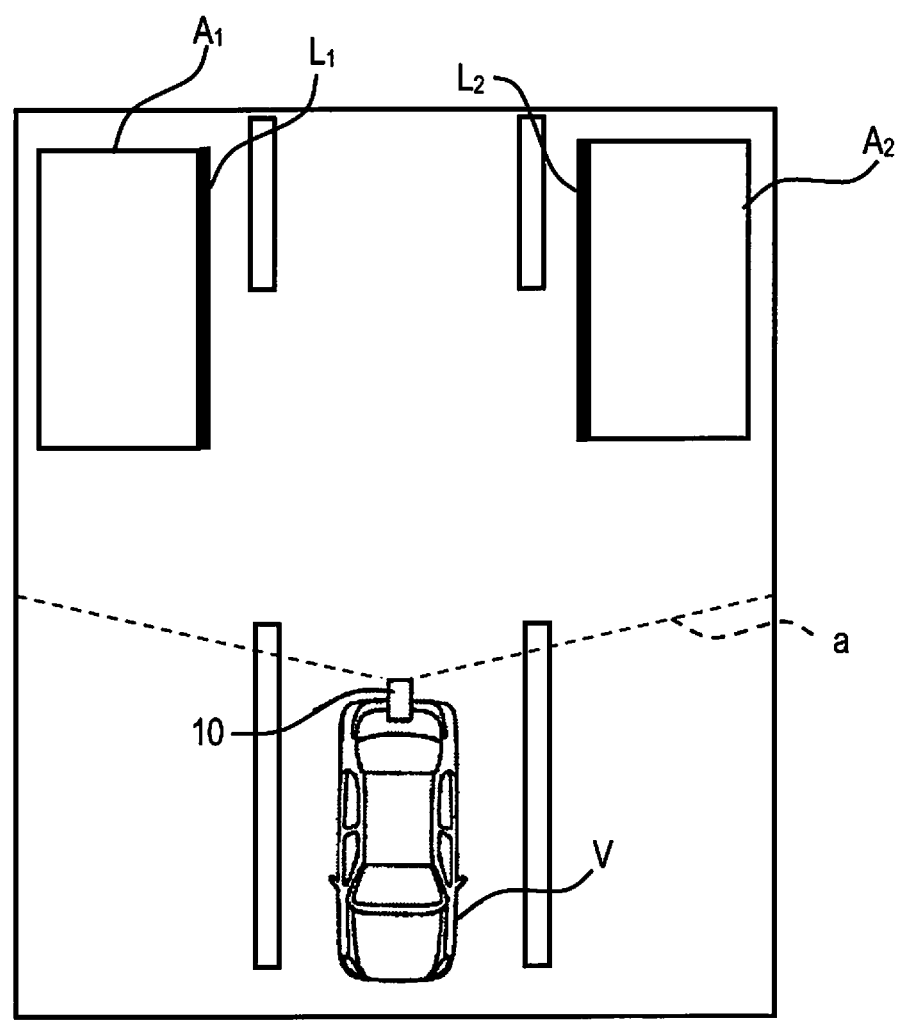
FIG. 2 is a plan view (three-dimensional object detection by differential waveform information) illustrating the driving state of the vehicle in FIG. 1.

FIG. 2 is a plan view illustrating the driving state of the host vehicle V in FIG. 1. As illustrated in the drawing, the camera 10 captures the rear side of the vehicle at a predetermined view angle a. At this time, the view angle a of the camera 10 is set to a view angle that allows the left and right lanes to be captured in addition to the lane in which the host vehicle V is driving. The areas that can be captured include the detection object areas A1, A2 in the adjacent lanes to the left and right of the driving lane of the host vehicle V at the rear of the host vehicle V. The rear of the vehicle in the present embodiment includes not only directly behind the vehicle but also the sides of the rear side of the vehicle. The area rear of the vehicle that is captured is set according to the view angle of the camera 10. As an example, when directly behind the vehicle, along the vehicle length direction is assumed to be zero degrees, but this can be set to include an area that is 0 degrees to 90 degrees, preferably 0 degrees to 70 degrees or the like, to the left and right of the directly behind direction.

Figure 3:
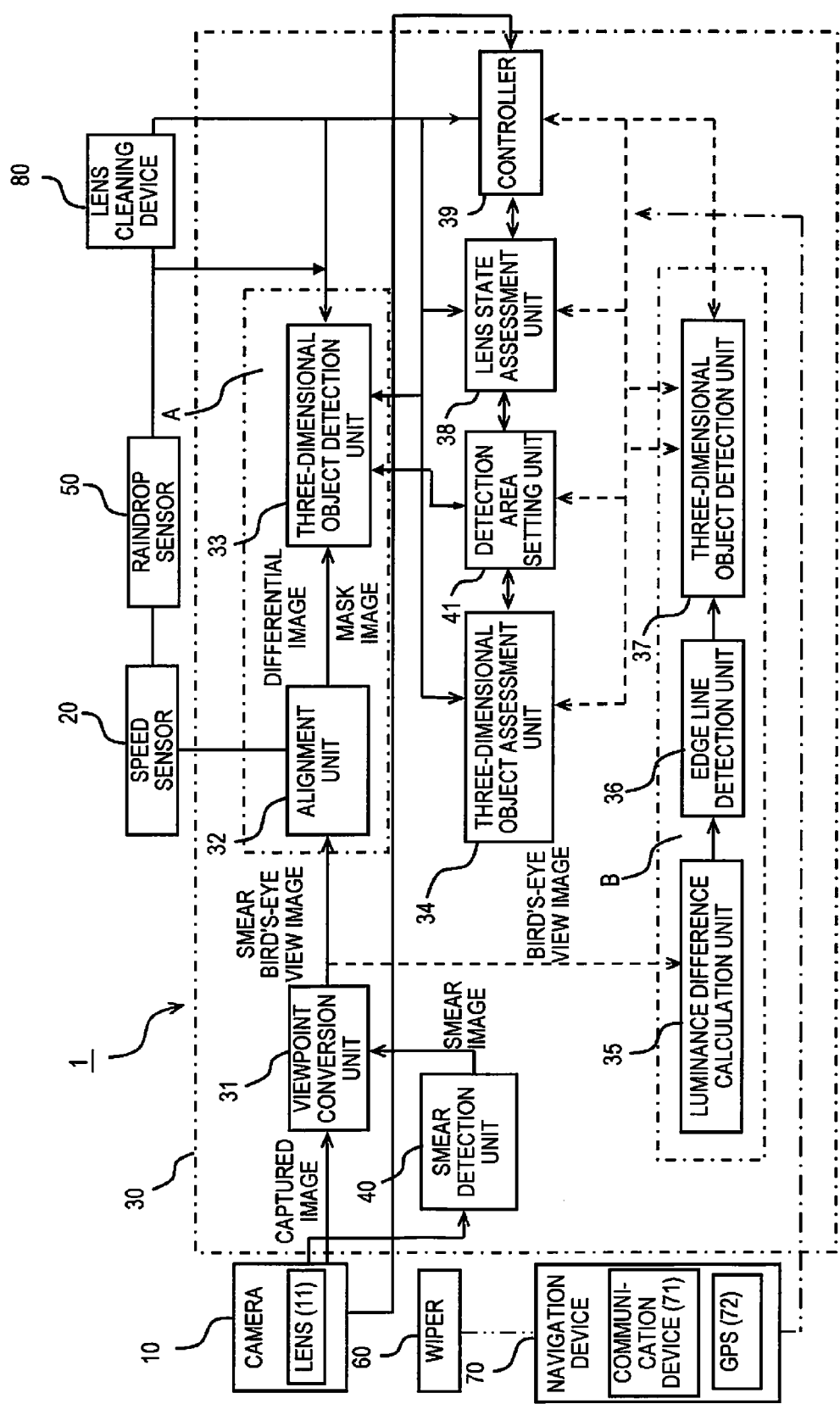
FIG. 3 is a block view illustrating the details of the computer in FIG. 1.

FIG. 3 is a block view illustrating the details of the computer 30 in FIG. 1. The camera 10, as well as the vehicle speed sensor 20, the raindrop sensor 50, the wiper 60, the navigation device 70, and the lens cleaning device 80, are also illustrated in FIG. 3 in order to distinctly indicate the connection relationships. The vehicle speed sensor 20, the raindrop sensor 50, the wiper 60, the navigation device 70, and the lens cleaning device 80 are mounted to a vehicle and can send and receive information to and from the computer 30 via an onboard communication network, such as a CAN (Controller Area Network).

As illustrated in FIG. 3, the computer 30 is provided with a viewpoint conversion unit 31, an alignment unit 32, a three-dimensional object detection unit 33, a three-dimensional object assessment unit 34, a lens state assessment unit 38, a detection area setting unit 41, a controller 39, and a smear detection unit 40. The computer 30 of the present embodiment is a configuration related to a detection block for a three-dimensional object that utilizes differential waveform information. The computer 30 of the present embodiment can also have a configuration related to a detection block for a three-dimensional object that utilizes the edge information. In this case, the configuration can be such that, in the configuration illustrated in FIG. 3, the block configuration A, configured by the alignment unit 32 and the three-dimensional object detection unit 33, is switched with the block configuration B, configured by the luminance difference calculation unit 35 surrounded by the broken line, the edge line detection unit 36, and the three-dimensional object detection unit 37. Of course, the configuration can be such that both the block configuration A and the block configuration B are provided in order to enable the possibility of detecting three-dimensional objects utilizing the differential waveform information, as well as detecting three-dimensional objects utilizing the edge information. In the case that the block configuration A and the block configuration B are provided, either the block configuration A or the block configuration B can be operated according to environmental factors, such as brightness. Each of the configurations is described below.

Detection of Three-Dimensional Object Using Differential Waveform Information

The three-dimensional object detection device 1 of the present embodiment detects a three-dimensional object that is present in a detection area A1 on the right side adjacent lane or a detection area A2 on the left side adjacent lane rear of the vehicle, based on the image information obtained by a monocular camera that captures the rear of the vehicle. The detection area setting unit 41 sets the detection areas A1, A2 at both the right side and left side behind the host vehicle V within the captured image information and changes those positions. The positions of these detection areas A1, A2 are not particularly limited and can be appropriately set according to the processing conditions. In particular, when the lens state assessment unit 38 mentioned below has determined that the lens 11 is in a wet state, the detection area setting unit 41 of the present embodiment changes the positions of the first detection areas A11, A21, which are first set as the detection areas A1, A2, so that they do not include a display area of a white line on the driving lane side of the host vehicle V among the white lines on the adjacent lane, which is adjacent to the lane in which the host vehicle V drives, and sets the second detection areas A12, A22 as new the detection areas A1, A2. Setting the new second detection areas A12, A22 will be described in detail below.

Next, the viewpoint conversion unit will be described. The captured image data of the predetermined area obtained by the camera 10 is input into the viewpoint conversion unit 31, and the captured image data thus input is converted into bird's-eye view image data, which is a bird's-eye view state. A bird's-eye view state is a state of viewing an object from a viewpoint of an imaginary camera that is looking down from above, in particular, vertically downward. Viewpoint conversion can be carried out in the manner described in, for example, Japanese Laid-Open Patent Application No. 2008-219063. The reason that captured image data is converted into bird's-eye view image data is based on the principle that perpendicular edges unique to a three-dimensional object are converted into a straight-line group that passes through a specific fixed point by viewpoint conversion into bird's-eye view image data; utilizing this principle allows a planar object and a three-dimensional object to be differentiated. The results of the image conversion process by the planar object 31 are also utilized in the detection of planar objects by the edge information, as described below.

Figure 4:
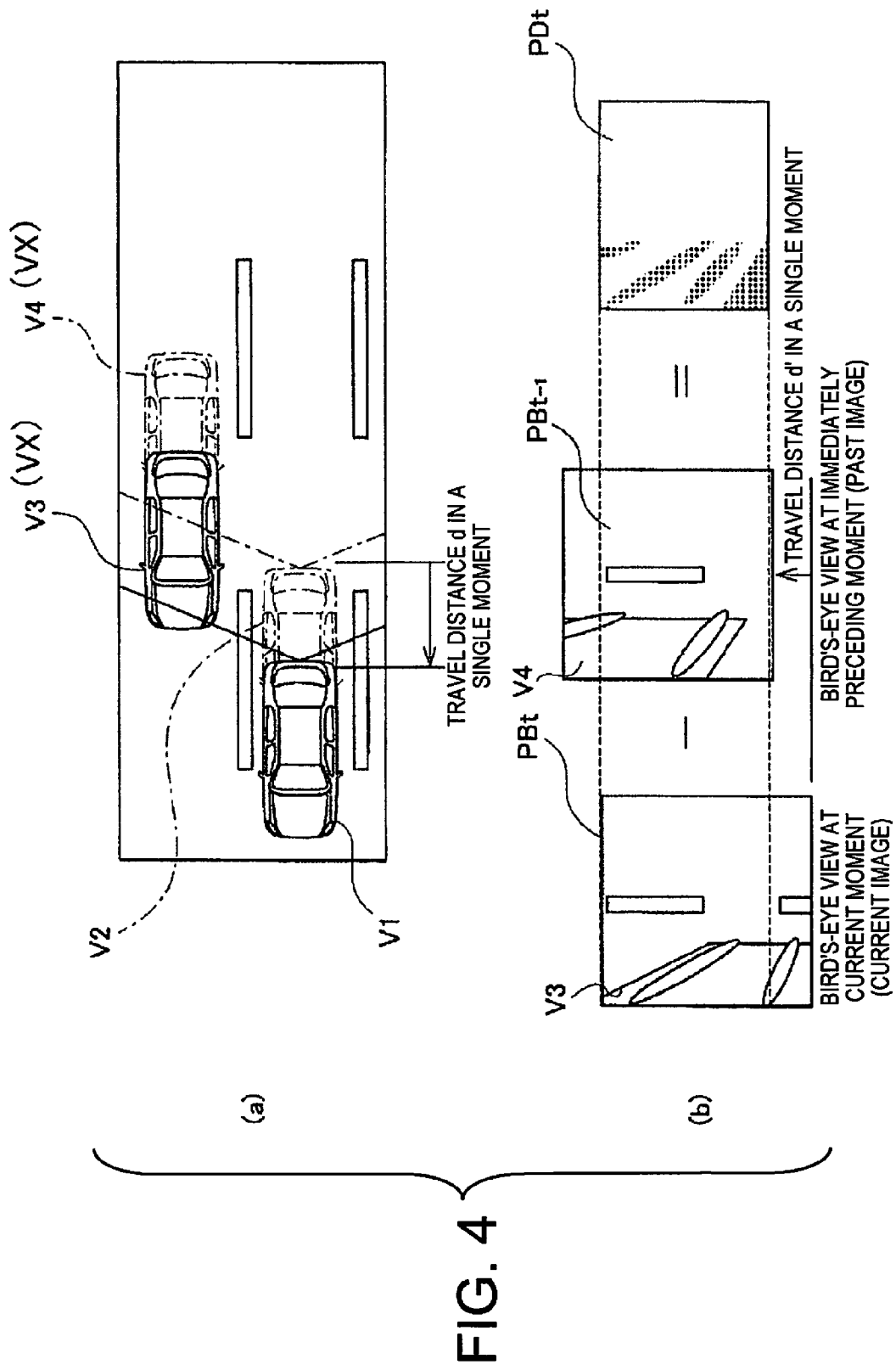
FIG. 4 is a view showing the general overview of the processing of the alignment unit in FIG. 3, with part (a) being a plan view illustrating the traveling state of the vehicle, and part (b) being an image illustrating a general overview of the alignment.

The bird's-eye view image data obtained by viewpoint conversion, which is carried out by the viewpoint conversion unit 31, are sequentially input into the alignment unit 32, and the input positions of the bird's-eye view image data at different times are aligned. FIG. 4 is a view showing the general overview of the processing of the alignment unit 32; with part (a) of FIG. 4 being a plan view illustrating the traveling state of the host vehicle V, and part (b) of FIG. 4 being an image illustrating a general overview of the alignment.

As illustrated in part (a) of FIG. 4, an assumption is made that the host vehicle V at the current moment is positioned at V1 and that the host vehicle V at a single moment prior was positioned at V2. An assumption is also made that another vehicle VX is positioned at the rear of the host vehicle V and is driving parallel to the host vehicle V, that the other vehicle VX at the current moment is positioned at V3, and the other vehicle VX at a single moment prior was positioned at V4. Also, an assumption is made that the host vehicle V has moved a distance d in a single moment. The phrase "at a single moment prior" may be a moment in the past that is a time set in advance (e.g., a single control cycle) from the current moment, or this may be a moment in the past that is an arbitrary time.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but the position of another vehicle VX in position V3 is collapsed. Additionally, the white lines drawn on the road surface are also rectangular in a bird's-eye view image $PB_t$ at a single moment prior and are relatively accurate in a planar view, but another vehicle VX in position V4 is collapsed. As previously described, the perpendicular edges of a three-dimensional object (the edges that stand erect in three-dimensional space from the road surface are also included in a strict meaning of perpendicular edge) appear as a straight-line group along a collapsing direction due to the operation for converting the viewpoint into bird's-eye view image data; however, because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior and matches the position with the bird's-eye view image $PB_t$ at the current moment. The left-side image and the center image in part (a) of FIG. 4 illustrate the offset state by a travel distance d'. The offset amount d' is the amount of movement in the bird's-eye view image data that corresponds to the actual travel distance d of the host vehicle V, as illustrated in part (a) of FIG. 4, and is determined based on a signal from the vehicle speed sensor 20 and the time at a single moment prior to the current moment.

After alignment, the alignment unit 32 obtains the difference between the bird's-eye view images $PB_t$ and $PB_{t-1}$ and generates differential image $PD_t$ data. Here, the pixel values of the differential image $PD_t$ may be the absolute values of the difference in the pixel values of the bird's-eye view images $PB_t$ and $PB_{t-1}$; alternately, they may be set to "1" when the absolute value exceeds a predetermined threshold value p and set to "0" when this has not been exceeded in order to correspond to a variation in the illumination environment. The right side image in FIG. 4 is the differential image $PD_t$.

Returning to FIG. 3, the three-dimensional object detection unit 33 detects a three-dimensional object based on the differential image $PD_t$ data illustrated in part (b) of FIG. 4. In this case, the three-dimensional object detection unit 33 of the present example calculates the travel distance of the three-dimensional object in actual space. The three-dimensional object detection unit 33 first generates a first differential waveform when the three-dimensional object is detected and the travel distance is to be calculated. The travel distance per unit of time of the three-dimensional object is used for calculating the traveling speed of the three-dimensional object. The traveling speed of the three-dimensional object can be used to determine whether or not the three-dimensional object is a vehicle.

In generating the differential waveform, the three-dimensional object detection unit 33 of the present embodiment sets a detection area in the differential image $PD_t$. The three-dimensional object detection device 1 of the present example detects another vehicle to which a driver of the host vehicle V pays attention and, in particular, another vehicle driving in a lane adjacent to the lane in which the host vehicle V drives when contact is possible should the host vehicle V change lanes, as an object to be detected. Accordingly, in the present example, in which three-dimensional objects are detected based on image information, two detection areas to the right side and the left side of the host vehicle V are set in the images obtained from the camera 10. Specifically, in the present embodiment, the rectangular detection areas A1, A2 are set on the left side and the right side at the rear of the host vehicle V, as illustrated in FIG. 2. Another vehicle that is detected in these detection areas A1, A2 is detected as an obstacle that is driving in an adjacent lane that is adjacent to the lane in which the host vehicle V is driving. Such detection areas A1, A2 may be set from a relative position to the host vehicle V, or they may be set based on the position of the white lines. When set based on the position of the white lines, the three-dimensional object detection device 1 may use, for example, what is known as white line recognition techniques.

The three-dimensional object detection unit 33 recognizes as ground lines L1, L2 (FIG. 2) the borders of the detection areas A1, A2 thus set on the host vehicle V side (the side in line with the driving direction). Generally, a ground line refers to a line in which a three-dimensional object is in contact with the ground; however, in the present embodiment, a ground line is not a line in contact with the ground but is rather set in the manner described above. Even in such a case, the difference between the ground line according to the present embodiment and the normal ground line determined from the position of the other vehicle VX is not exceedingly great as determined by experience, and there is no problem in actuality.

Figure 5:
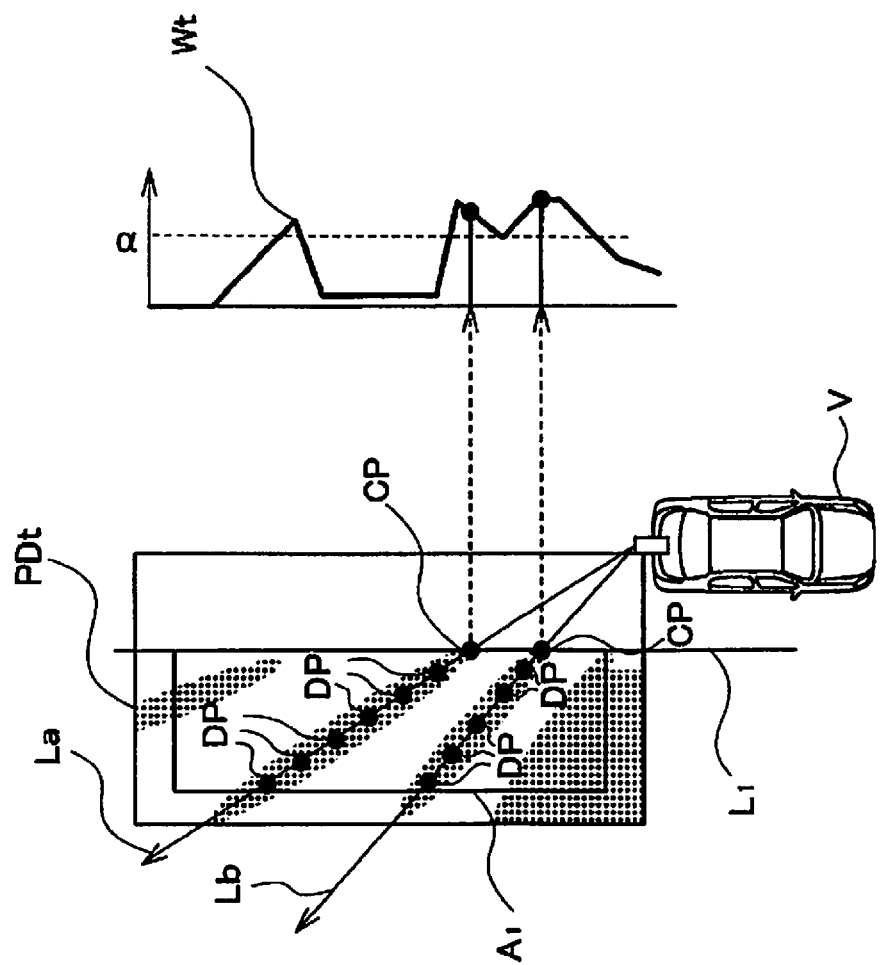
FIG. 5 is a schematic view illustrating the manner in which a differential waveform is generated by the three-dimensional object detection unit in FIG. 3.

FIG. 5 is a schematic view illustrating the manner in which a differential waveform is generated by the three-dimensional object detection unit 33 illustrated in FIG. 3. As illustrated in FIG. 5, the three-dimensional object detection unit 33 generates a differential waveform $DW_t$ from the portion that corresponds to the detection areas A1, A2 in the differential image $PD_t$ (the drawing on the right in FIG. 4(b)) calculated by the alignment unit 32. In this case, the three-dimensional object detection unit 33 generates a differential waveform $DW_t$ along the collapsing direction of the three-dimensional object by viewpoint conversion. In the example illustrated in FIG. 5, only the detection area A1 will be shown for the sake of convenience, but the differential waveform $DW_t$ is generated for the detection area A2 as well using the same procedure.

More specifically, the three-dimensional object detection unit 33 defines a line La in the collapsing direction of the three-dimensional object in the data for the differential image $PD_t$. The three-dimensional object detection unit 33 then counts the number of difference pixels DP indicating a predetermined difference on the line La. Here, the difference pixel DP indicating a predetermined difference is a pixel that exceeds a predetermined threshold value in the case that the pixel value of the differential image $PD_t$ is the absolute value of the difference in the pixel values of the bird's-eye view images $PB_t$, $PB_{t-1}$; the difference pixel is a pixel indicating "1" in the case that the pixel value of the differential image $PD_t$ is expressed by "0" or "1."

The three-dimensional object detection unit 33 counts the number of difference pixels DP and, thereafter, determines the crossing point CP of the line La and the ground line L1. The three-dimensional object detection unit 33 then correlates the crossing point CP and the count number, decides the horizontal-axis position, in particular, the position on the axis in the vertical direction in the drawing on the right in FIG. 5, based on the position of the crossing point CP; then, the three-dimensional object detection unit decides the vertical-axis position, in particular, the position on the axis in the lateral direction in the drawing on the right in FIG. 5, from the count number and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution, thereby generating a differential waveform $DW_t$, as illustrated in the drawing on the right in FIG. 5.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when an assumption is made that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is determined from the count number of the difference pixels DP. In a specific example, there are six difference pixels DP on the line La, and there are five difference pixels DP on the line Lb in the drawing on the left in FIG. 5. Accordingly, when the vertical-axis position is determined from the count number in FIG. 5, the three-dimensional object detection unit 33 divides the count number by the overlapping distance or performs normalization in another manner. The values of the differential waveform $DW_t$ that correspond to the lines La, Lb in the direction in which the three-dimensional object collapses are thereby made to be substantially the same, as illustrated in the differential waveform $DW_t$.

After the differential waveform $DW_t$ has been generated, the three-dimensional object detection unit 33 calculates the travel distance by a comparison with the differential waveform $DW_{t-1}$ at a single moment prior. In other words, the three-dimensional object detection unit 33 calculates the travel distance from the change in time of the differential waveforms $DW_t$, $DW_{t-1}$.

Figure 6:
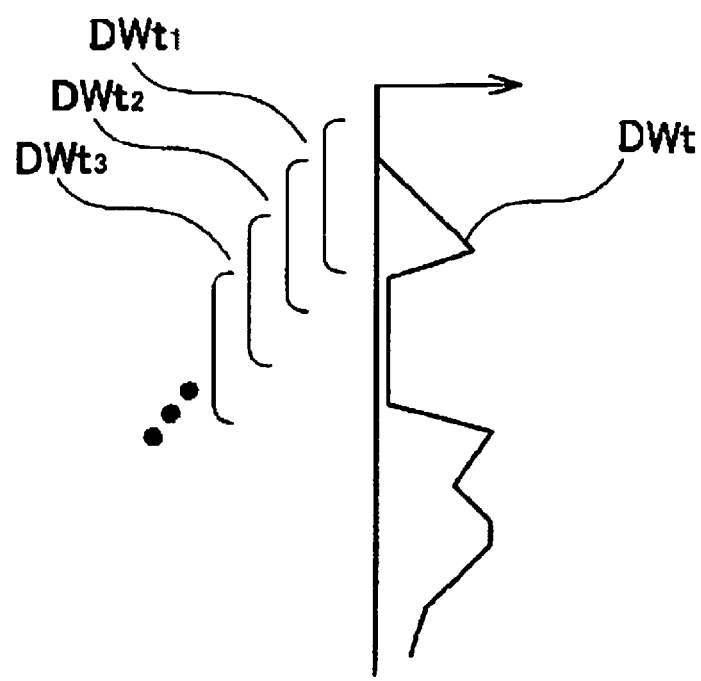
FIG. 6 is a view illustrating the small areas divided by the three-dimensional object detection unit in FIG. 3.

More specifically, the three-dimensional object detection unit 33 divides the differential waveform $DW_t$ into a plurality of small areas $DW_{t1}$ to $DW_{tn}$ (where n is an arbitrary integer of 2 or greater), as illustrated in FIG. 6. FIG. 6 is a view illustrating the small areas $DW_{t1}$ to $DW_{tn}$ divided by the three-dimensional object detection unit 33. The small areas $DW_{t1}$ to $DW_{tn}$ are divided so as to be mutually overlapping, as illustrated in, for example, FIG. 6. For example, the small area $DW_{t1}$ and the small area $DW_{t2}$ overlap each other, and the small area $DW_{t3}$ and the small area $DW_{t3}$ overlap each other.

Next, the three-dimensional object detection unit 33 determines the offset amount (the amount of movement in the horizontal-axis direction (the vertical direction in FIG. 6) of the differential waveform) for each of the small areas $DW_{t1}$ to $DW_{tn}$. Here, the offset amount is determined from the difference (the distance in the horizontal-axis direction) between the differential waveform $DW_{t-1}$ at a single moment prior and the differential waveform $DW_t$ at the current moment. In this case, the three-dimensional object detection unit 33 moves the differential waveform $DW_{t-1}$ at a single moment prior in the horizontal-axis direction for each of the small areas $DW_{t1}$ to $DW_{tn}$, and then assesses the position (the position in the horizontal-axis direction) in which the error from the differential waveform $DW_t$ at the current moment is at a minimum; the three-dimensional object detection unit then determines as the offset amount the movement amount in the horizontal-axis direction at the position in which the error from the original position of the differential waveform $DW_{t-1}$ is at a minimum. Next, the three-dimensional object detection unit 33 counts the offset amount determined for each of the small areas $DW_{t1}$ to $DW_{tn}$ and forms a histogram.

Figure 7:
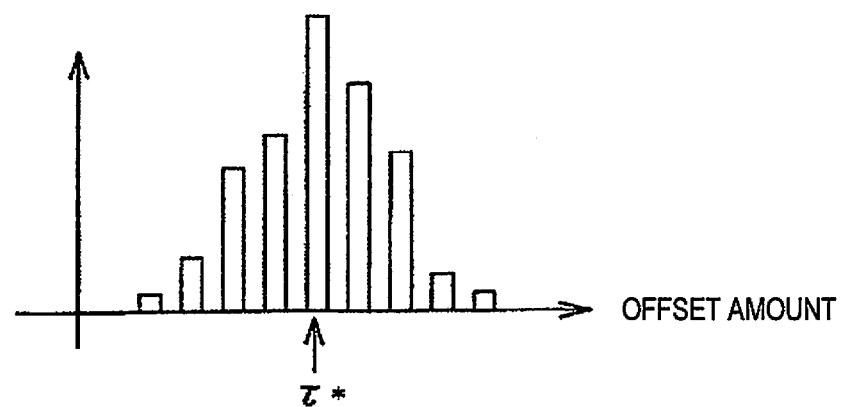
FIG. 7 is a view illustrating an example of the histogram obtained by the three-dimensional object detection unit in FIG. 3.

FIG. 7 is a view illustrating an example of the histogram obtained by the three-dimensional object detection unit 33. As illustrated in FIG. 7, some amount of variability occurs in the offset amount, which is the movement amount in which the error between the small areas $DW_{t1}$ to $DW_{tn}$ and the differential waveform $DW_{t-1}$ at a single moment prior is at a minimum. Accordingly, the three-dimensional object detection unit 33 forms the offset amounts, including the variability, into a histogram and calculates the travel distance from the histogram. At this point, the three-dimensional object detection unit 33 calculates the travel distance of the three-dimensional object from the maximum value in the histogram. In other words, in the example illustrated in FIG. 7, the three-dimensional object detection unit 33 calculates the offset amount indicating the maximum value of the histogram as the travel distance $\tau^*$. The travel distance $\tau^*$ is the relative travel distance of another vehicle VX in relation to the host vehicle V. Accordingly, the three-dimensional object detection unit 33 calculates the absolute travel distance based on the travel distance $\tau^*$ thus obtained and a signal from the vehicle speed sensor 20 when the absolute travel distance is to be calculated.

Figure 8:
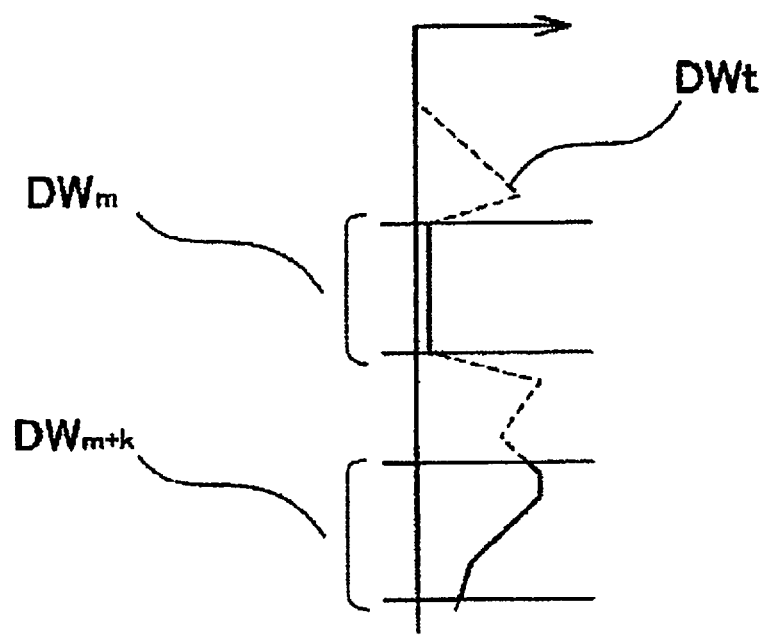
FIG. 8 is a view illustrating the weighting used by the three-dimensional object detection unit in FIG. 3.

When a histogram is to be formed, the three-dimensional object detection unit 33 may weight the plurality of small areas $DW_{t1}$ to $DW_{tn}$ and count the offset amounts determined for each of the small areas $DW_{t1}$ to $DW_{tn}$ in accordance with the weighting to form a histogram. FIG. 8 is a view illustrating the weighting used by the three-dimensional object detection unit 33.

As illustrated in FIG. 8, a small area $DW_m$ (where m is an integer 1 or greater, and n is −1 or less) is flat. In other words, in the small area $DW_m$, there is little difference between the maximum and minimum values of the count of the number of pixels indicating a predetermined difference. The three-dimensional object detection unit 33 reduces the weighting of this type of small area $DW_m$. This is because the flat small area $DW_m$ lacks a characteristic and because there is a high possibility that an error will be magnified when the offset amount is calculated.

On the other hand, a small area $DW_{m+k}$ (where k is an integer n−m or less) has abundant undulations. In other words, in the small area $DW_m$, there is a considerable difference between the maximum and minimum values of the count of the number of pixels indicating a predetermined difference. The three-dimensional object detection unit 33 reduces the weighting of this type of small area $DW_m$. This is because the small area $DW_{m+k}$ that has abundant undulations is characteristic and because there is a high possibility that the offset amount will be accurately calculated. Weighting the small areas in this manner facilitates the enhancement the precision of the calculation of the travel distance.

The first differential waveform $DW_t$ is divided into a plurality of small areas $DW_{t1}$ to $DW_{tn}$ in the present embodiment in order to enhance the precision of the calculation of the travel distance, but this division into the small areas $DW_{t1}$ to $DW_{tn}$ is not required when a precise calculation of the travel distance is not necessary. In this case, the three-dimensional object detection unit 33 calculates the travel distance from the offset amount of the differential waveform $DW_t$ when the error between the differential waveform $DW_t$ and the differential waveform $DW_{t-1}$ is at a minimum. In other words, the method for determining the offset amount between the differential waveform $DW_{t-1}$ at a single moment prior and the differential waveform $DW_t$ at the current moment is not limited to the details described above.

Returning to FIG. 3, the computer 30 is provided with a smear detection unit 40. The smear detection unit 40 detects the smear-generated areas from the captured image data captured by the camera 10. Since a smear is a halation phenomenon that occurs in a CCD image sensor or the like, the smear detection unit 40 may be omitted when using a camera 10 that uses a CMOS image sensor or the like, which does not generate such smears.

Figure 9:
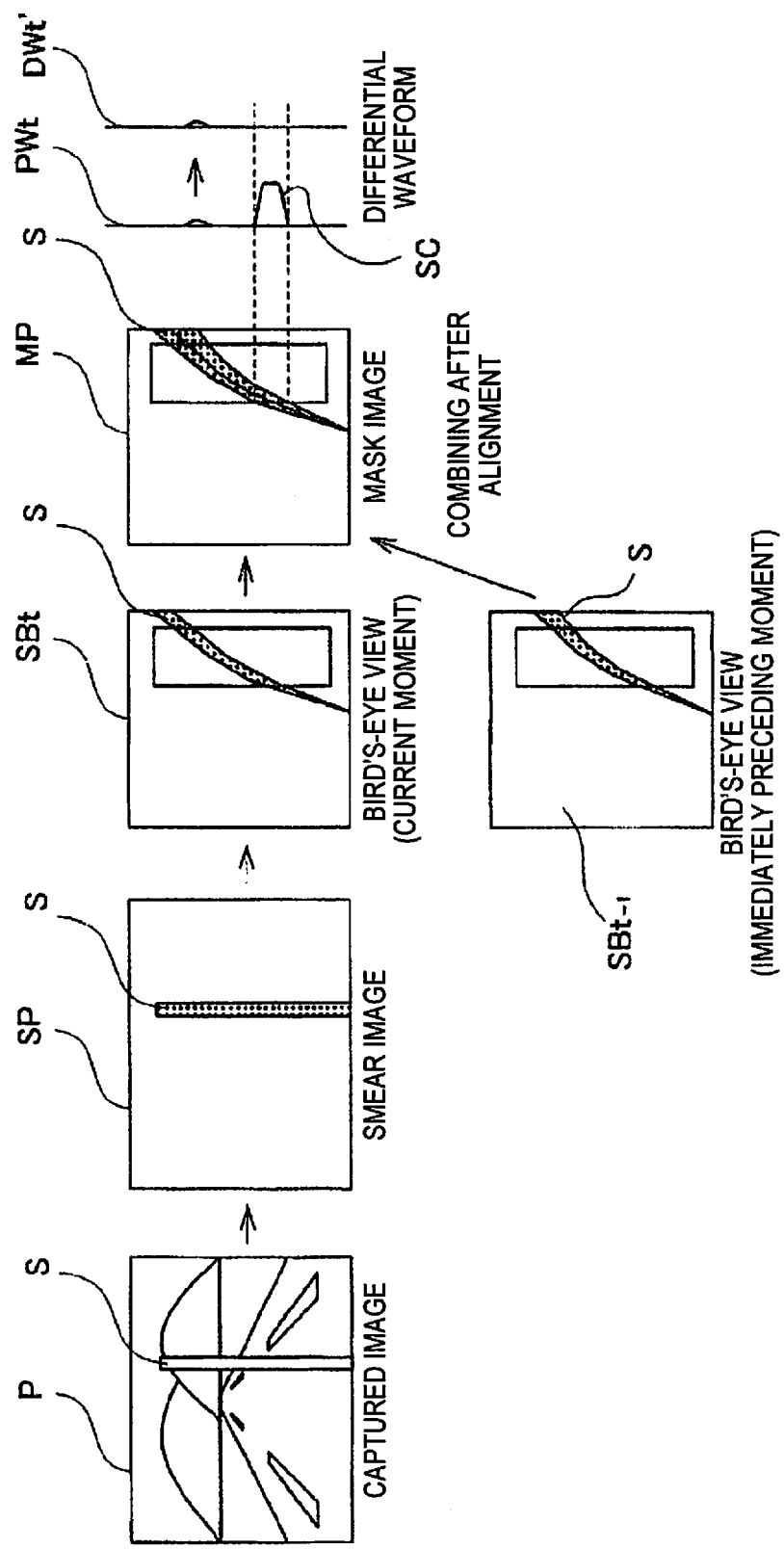
FIG. 9 is a view illustrating the processing of the smear detection unit in FIG. 3 and the calculation operation for a differential waveform thereby.

FIG. 9 is an image view showing the processing of the smear detection unit in FIG. 3, as well as the calculation operation for the differential waveform $DW_t$. First, an assumption is made that captured image P data, in which a smear S is present, are input into the smear detection unit 40. At this time, the smear detection unit 40 detects the smear S from the captured image P. There are various methods for detecting smears S, but in the case of, for example, a common CCD (Charge-Coupled Device) camera, smears S only occur below the light source in the image. Accordingly, in the present embodiment, a region that has a luminance value of a predetermined value or more from the lower side of the image toward the top of the image and that is continuous in the vertical direction is searched and is specified as the smear S generated area.

The smear detection unit 40 also generates smear image SP data, in which the pixel values for the smear S generated location are set to "1" and the other locations are set to "0."

After generation, the smear detection unit 40 transmits the smear image SP data to the viewpoint conversion unit 31. The viewpoint conversion unit 31, to which the smear image SP data have been input, converts the data into a bird's-eye view state. The viewpoint conversion unit 31 thereby generates smear bird's-eye view image $SB_t$ data. After generation, the viewpoint conversion unit 31 transmits the smear bird's-eye view image $SB_t$ data to the alignment unit 33. In addition, the viewpoint conversion unit 31 transmits the smear bird's-eye view image $SB_{t-1}$ data at a single moment prior to the alignment unit 33.

The alignment unit 32 aligns the smear bird's-eye view images $SB_t$ and $SB_{t-1}$ in terms of data. The specifics of the alignment are the same as when aligning bird's-eye view images $PB_t$ and $PB_{t-1}$ in terms of data. After alignment, the alignment unit 32 takes the logical sum of the smear S generated areas in each of the smear bird's-eye view images $SB_t$ and $SB_{t-1}$. The viewpoint conversion unit 32 thereby generates mask image MP data. After generation, the alignment unit 32 transmits the mask image MP data to the three-dimensional object detection unit 33.

The three-dimensional object detection unit 33 zeros the count number of the frequency distribution for the locations that correspond to the smear S generated area within the mask image MP. In other words, when a differential waveform $DW_t$, such as that illustrated in FIG. 9, has been generated, the three-dimensional object detection unit 33 zeros the count number SC by the smear S and generates a corrected differential waveform $DW_t$.

The three-dimensional object detection unit 33 in the present embodiment determines the traveling speed of the host vehicle V (camera 10) and determines the offset amount for a stationary object from the determined traveling speed. After the offset amount of the stationary object has been determined, the three-dimensional object detection unit 33 ignores the offset amount that corresponds to the stationary object within the maximum value of the histogram and calculates the travel distance of the three-dimensional object.

Figure 10:
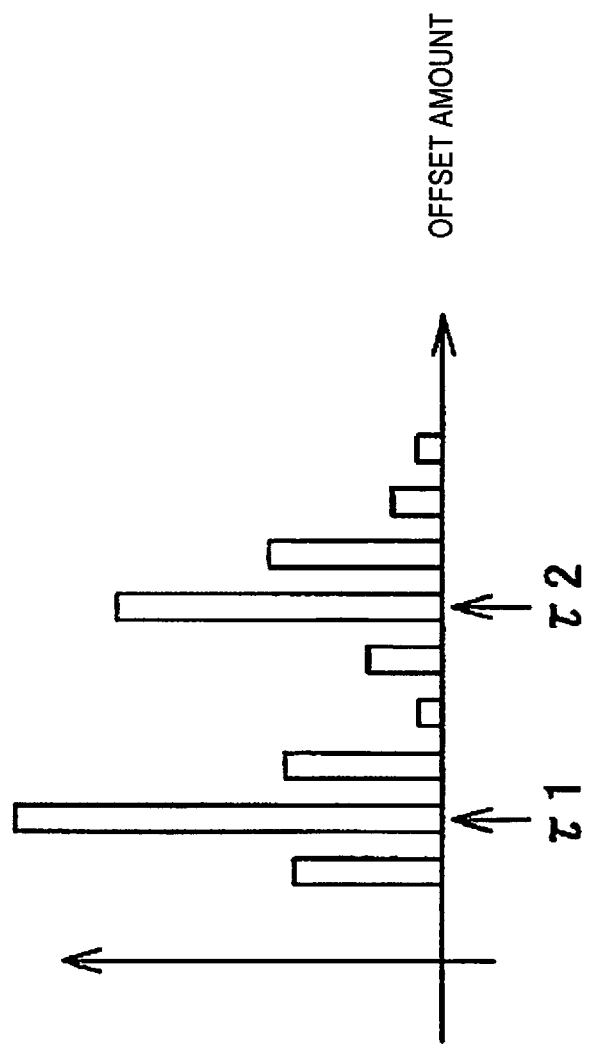
FIG. 10 is a view illustrating another example of the histogram obtained by the three-dimensional object detection unit in FIG. 3.

FIG. 10 is a view illustrating another example of the histogram obtained by the three-dimensional object detection unit 33. When a stationary object other than another vehicle VX is present within the view angle of the camera 10, two maximum values τ1, τ2 appear in the resulting histogram. In this case, one of the two maximum values τ1, τ2 is the offset amount of the stationary object. Consequently, the three-dimensional object detection unit 33 determines the offset amount for the stationary object from the traveling speed, ignores the maximum value that corresponds to the offset amount, and calculates the travel distance of the three-dimensional object using the remaining maximum value.

Even when the offset amount corresponding to the stationary object is ignored, there may be a plurality of other vehicles VX present within the view angle of the camera 10 when there is a plurality of maximum values. However, a plurality of other vehicles VX present within the detection areas A1, A2 occurs very rarely. Accordingly, the three-dimensional object detection unit 33 stops calculating the travel distance.

Figure 11:
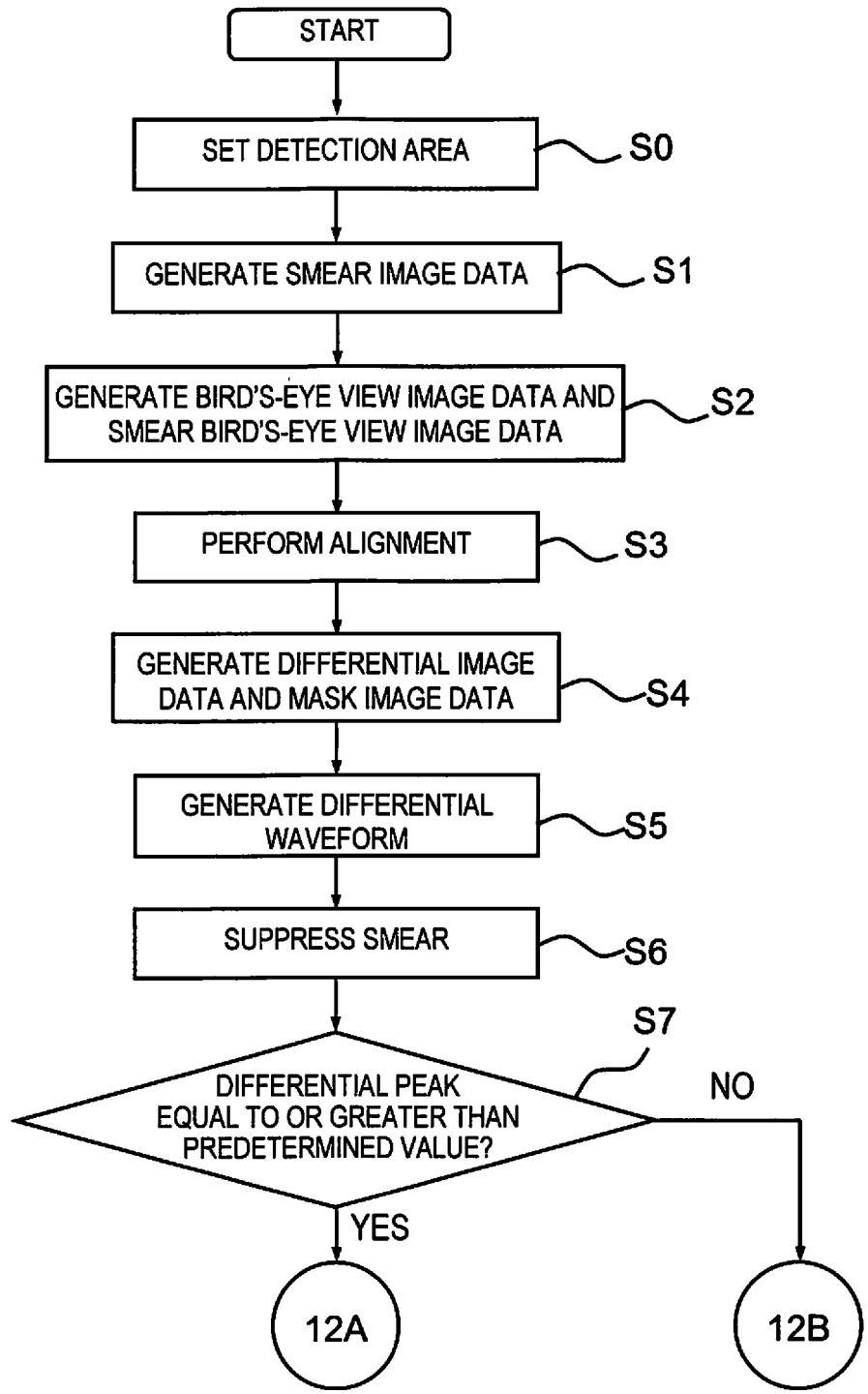
FIG. 11 is a first part of a flowchart illustrating the three-dimensional object detection method using the differential waveform information that is executed by the viewpoint conversion unit, the alignment unit, the smear detection unit, and the three-dimensional object detection unit in FIG. 3.
Figure 12:
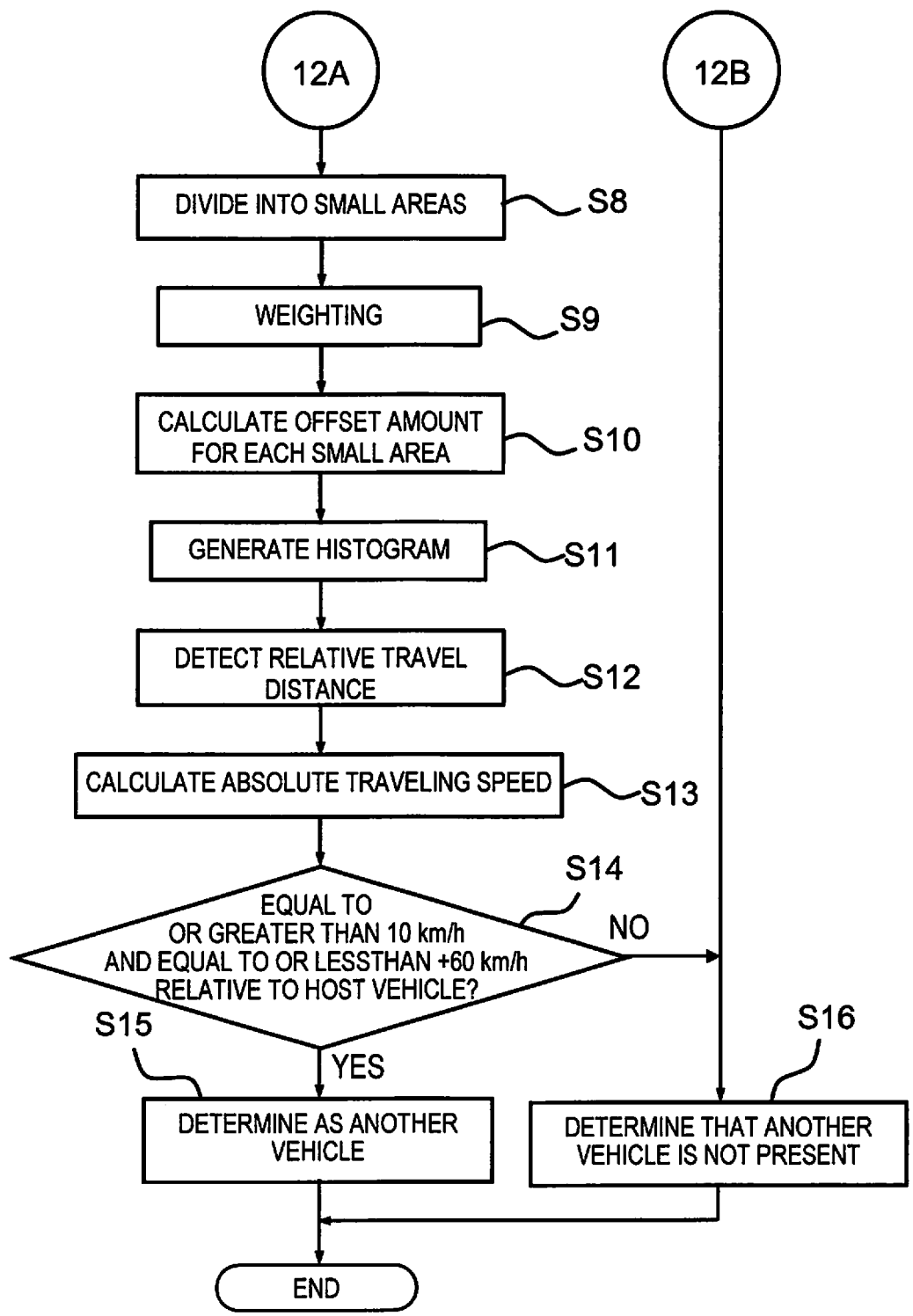
FIG. 12 is a second part of a flowchart illustrating the three-dimensional object detection method using the differential waveform information that is executed by the viewpoint conversion unit, the alignment unit, the smear detection unit, and the three-dimensional object detection unit in FIG. 3.

Next, the procedure of detecting a three-dimensional object with the differential waveform information will be described. FIG. 11 and FIG. 12 are flowcharts illustrating the procedure of detecting a three-dimensional object according to the present embodiment. As illustrated in FIG. 11, first, in Step S0, the computer 30 sets the detection area based on a predetermined rule. The method for setting this detection area will be described in detail below. Then, the data of the captured image P from the camera 10 are input into the computer 30, and a smear image SP is generated by the smear detection unit 40 (S1). Next, the viewpoint conversion unit 31 generates the bird's-eye view image $PB_t$ data from the data of the captured image P from the camera 10 and generates the smear bird's-eye view image $SB_t$ data from the smear image SP data.

The alignment unit 33 then aligns the bird's-eye view image $PB_t$ data and the bird's-eye view image $PB_{t-1}$ data at a single moment prior and aligns the smear bird's-eye view image $SB_t$ data and the smear bird's-eye view image $SB_{t-1}$ data at a single moment prior (S3). After this alignment, the alignment unit 33 generates differential image $PD_t$ data and mask image MP data (S4). The three-dimensional object detection unit 33 then generates a differential waveform $DW_t$ from the differential image $PD_1$ data and the differential image $PD_{t-1}$ data at a single moment prior (S5). After generating the differential waveform $DW_t$, the three-dimensional object detection unit 33 zeros the count number that corresponds to the smear S generated area within the differential waveform $DW_t$ and suppresses the impact of the smear S (S6).

The three-dimensional object detection unit 33 then determines whether or not the peak of the differential waveform $DW_t$ is at a first threshold value α or greater (S7). When the peak of the differential waveform $DW_t$ is not at the first threshold value α or greater, in particular, when there is essentially no difference, the thought is that a three-dimensional object is not present in the captured image P. Accordingly, when a determination has been made that the peak of the differential waveform $DW_t$ is not at the threshold value α or greater (S7: No), the three-dimensional object detection unit 33 determines that a three-dimensional object is not present and that another vehicle as an obstacle is not present (FIG. 12: S16). Then, the operation illustrated in FIG. 11 and FIG. 12 ends.

On the other hand, when the peak of the differential waveform $DW_t$ is determined to be at a threshold value α or greater (S7: Yes), the three-dimensional object detection unit 33 determines that a three-dimensional object is present and divides the differential waveform $DW_t$ into a plurality of small areas $DW_{t1}$ to $DW_{tn}$ (S8). Next, the three-dimensional object detection unit 33 weights each of the small areas $DW_{t1}$ to $DW_{tn}$ (S9). The three-dimensional object detection unit 33 then calculates the offset amount for each of the small areas $DW_{t1}$ to $DW_{tn}$ (S10) and generates a histogram with consideration given to the weights (S11).

The three-dimensional object detection unit 33 then calculates the relative travel distance, which is the travel distance of the three-dimensional object in relation to the host vehicle V, based on the histogram (S12). Next, the three-dimensional object detection unit 33 calculates the absolute traveling speed of the three-dimensional object from the relative travel distance (S13). At this time, the three-dimensional object detection unit 33 time-differentiates the relative travel distance to thereby calculate the relative traveling speed, adds the host vehicle's speed detected by the vehicle speed sensor 20, and calculates the relative traveling speed.

The three-dimensional object detection unit 33 then determines whether the absolute traveling speed of the three-dimensional object is 10 km/h or more and whether the relative traveling speed of the three-dimensional object in relation to the host vehicle V is +60 km/h or less (S14). When both conditions have been satisfied (S14: Yes), the three-dimensional object detection unit 33 determines that the three-dimensional object is another vehicle VX (S15). Then, the operation illustrated in FIG. 11 and FIG. 12 ends. On the other hand, when either one of the conditions has not been satisfied (S14: No), the three-dimensional object detection unit 33 determines that another vehicle is not present (S16). Then, the operation illustrated in FIG. 11 and FIG. 12 ends.

In the present embodiment, the detection areas A1, A2 are the rear side directions of the host vehicle V, and focus is placed on detecting another vehicle VX that is driving in an adjacent lane that is adjacent to the driving lane of the host vehicle, to which the host vehicle V should pay attention while driving; in particular, the focus is on whether the host vehicle V may possibly make contact with another vehicle should a lane change be made. This is to determine whether the host vehicle V may possibly make contact with another vehicle VX that is driving in an adjacent lane that is adjacent to the driving lane of the host vehicle should a lane change be made. Accordingly, the operation of Step S14 is implemented. In other words, assuming that the system in the present embodiment is actuated on an expressway, when the speed of a three-dimensional object is less than 10 km/h, there would rarely be a problem even if another vehicle VX were to be present because the other vehicle would be positioned far behind the host vehicle V when a lane change is made. Similarly, when the relative traveling speed of a three-dimensional object exceeds +60 km/h in relation to the host vehicle V (in particular, when the three-dimensional object is moving at a speed 60 km/h greater than the speed of the host vehicle V), there would rarely be a problem because the three-dimensional object would be positioned ahead of the host vehicle V when a lane change is made. Accordingly, Step S14 determines if another vehicle VX may pose a problem when a lane change is made.

In Step S14, a determination is made regarding whether the absolute traveling speed of the three-dimensional object is 10 km/h or more and whether the relative traveling speed of the three-dimensional object in relation to the host vehicle V is +60 km/h or less, thereby obtaining the following effect. For example, a possible case is that the absolute traveling speed of a stationary object is detected to be several kilometers per hour depending, on the attachment error of the camera 10. Accordingly, determining whether the speed is 10 km/h or greater facilitates the reduction of the possibility that the stationary object will be determined to be another vehicle VX. Also, there is a possibility that the relative speed of a three-dimensional object in relation to the host vehicle V will be detected to be in excess of +60 km/h due to noise. Accordingly, determining whether the relative speed is +60 km/h or less facilitates the reduction of the possibility of an erroneous detection due to noise.

Furthermore, in lieu of the process of Step S14, a determination can be made as to whether the absolute traveling speed is not negative or not 0 km/h. In addition, in the present embodiment, since the focus is placed on whether the host vehicle V may possibly make contact with another vehicle should a lane change be made, a warning sound may be emitted to the driver of the host vehicle or a corresponding warning may be displayed when another vehicle VX is detected in Step S15.

In this manner, according to the procedure for detecting a three-dimensional object by differential waveform information of the present example, the number of pixels that indicate a predetermined difference in the differential image $PD_t$ data is counted along the direction in which the three-dimensional object collapses due to viewpoint conversion, and a frequency distribution is formed to thereby generate a differential waveform $DW_t$. Here, the pixels that indicate a predetermined difference in the differential image $PD_t$ data are pixels that have changed in the image at different moments; in other words, these are the locations that can be construed to be where a three-dimensional object was present. Accordingly, in the locations where a three-dimensional object was present, the number of pixels is counted along the direction in which the three-dimensional object collapses to form a frequency distribution, thereby generating a differential waveform $DW_t$. In particular, the number of pixels is counted along the direction in which the three-dimensional object collapses, and a differential waveform $DW_t$ is therefore generated from the information about the height direction in relation to the three-dimensional object. Then, the travel distance of the three-dimensional object is calculated from the change in time of the differential waveform $DW_t$, which includes the height direction information. Consequently, in contrast to the focus being solely on the movement of a single point, the detection location prior to the change in time and the detection location after the change in time are specified with the included height direction information and accordingly readily end up being the same location as a three-dimensional object; therefore, the travel distance is calculated based on the change in time at the same location, and the precision of the calculation of the travel distance can be improved.

In addition, the count number of the frequency distribution for the locations that correspond to the smear generated area S within the differential waveform $DW_t$ is zeroed. The waveform portions within the differential waveform $DW_t$ that are generated due to the smear S are removed, thereby facilitating the prevention of a situation in which a smear S is misidentified as a three-dimensional object.

In addition, the travel distance of the three-dimensional object is calculated from the offset amount of the differential waveform $DW_t$ when the error between differential waveforms $DW_t$, which are generated at different times, is at a minimum. Accordingly, this allows the travel distance to be calculated from the offset amount, which is information about one dimension in a waveform, allowing computation costs to be kept low when the travel distance is calculated.

In addition, the differential waveforms $DW_t$ that are generated at different times are divided into a plurality of small areas $DW_{t1}$ to $DW_{tn}$. A plurality of waveforms representing each location of the three-dimensional object is obtained by dividing the differential waveforms into a plurality of small areas $DW_{t1}$ to $DW_{tn}$ in this manner. In addition, the offset amounts are determined when the error between each waveform is at a minimum for each of the small areas $DW_{t1}$ to $DW_{tn}$, and the offset amounts that are determined for each of the small areas $DW_{t1}$ to $DW_{tn}$ are counted to form a histogram, thereby calculating the travel distance of the three-dimensional object. Accordingly, the offset amount at each location of the three-dimensional object is determined, and the travel distance is determined from a plurality of offset amounts, so that the precision of calculating the travel distance can be improved.

In addition, the plurality of small areas $DW_{t1}$ to $DW_{tn}$ is weighted, and the offset amounts determined for each of the small areas $DW_{t1}$ to $DW_{tn}$ are counted in accordance with the weighting to form a histogram. Accordingly, calculating the travel distance more appropriately by increasing the weighting of the characteristic areas and decreasing the weighting of the uncharacteristic areas is possible. Thus, further enhancing the precision of calculating the travel distance becomes possible.

In addition, the weight is increased for each of the small areas $DW_{t1}$ to $DW_{tn}$ of the differential waveform $DW_t$, the larger the difference is between the maximum and minimum values of the count of the number of pixels indicating a predetermined difference. Accordingly, the areas with characteristic undulations with a large difference between the maximum and minimum values are weighted higher, and the flat areas with small undulations are weighted lower. Geometrically speaking, accurately determining the offset amount in areas with considerable undulations is easier than in flat areas; therefore, further enhancing the precision of the calculation of the travel distance by increasing the weighting for the areas with a considerable difference between the maximum and minimum values becomes possible.

In addition, the travel distance of the three-dimensional object is calculated from the maximum value in the histogram obtained by counting the offset amounts determined for each of the small areas $DW_{t1}$ to $DW_{tn}$. In this manner, a highly accurate travel distance can be calculated from the maximum value, even when there is variability in the offset amounts.

Additionally, since the offset amount for a stationary object is determined and this offset amount is ignored, preventing a situation in which the precision of the calculation of the travel distance of the three-dimensional object is reduced by the stationary object is possible. Also, when the offset amount that corresponds to the stationary object is ignored and there is a plurality of maximum values, the calculation of the travel distance of the three-dimensional object is stopped. Consequently, preventing a situation in which an erroneous travel distance is calculated, such as when there is a plurality of maximum values, is possible.

In the embodiments described above, the speed of the host vehicle V is determined based on a signal from the vehicle speed sensor 20, but no limitation is imposed thereby; using a configuration in which the speed is estimated from a plurality of images at different moments is also possible. In this case, the vehicle speed sensor 20 is not required, and the configuration can be simplified.

Furthermore, in the embodiments described above, a captured image of the current moment and an image at a single moment prior are converted into bird's-eye views; the converted bird's-eye views are aligned; a differential image $PD_t$ is then generated; and the generated differential image $PD_t$ is evaluated along the collapsing direction (the direction in which the three-dimensional object collapses when a captured image is converted into a bird's-eye view) to generate a differential waveform $DW_t$; however, no limitation is imposed thereby. For example, there is also the possibility of using a configuration in which only the image at a single moment prior is converted into a bird's-eye view; the converted bird's-eye view is aligned and then converted again into a captured image equivalent; a differential image is generated using this image and the image at the current moment; and the generated differential image is evaluated along the direction corresponding to the collapsing direction (in particular, the direction obtained by converting the collapsing direction into a direction in the captured image) in order to thereby generate the differential waveform $DW_t$. In other words, a bird's-eye view is not expressly required to be generated as a necessity as long as the image at the current moment and the image at a single moment prior are aligned, a differential image $PD_t$ is generated from the difference between the two aligned images, and the differential image $PD_t$ can be evaluated along the collapsing direction of a three-dimensional object when the differential image $PD_t$ is converted into a bird's-eye view.

Detection of a Three-Dimensional Object by Use of the Edge Information

Figure 13:
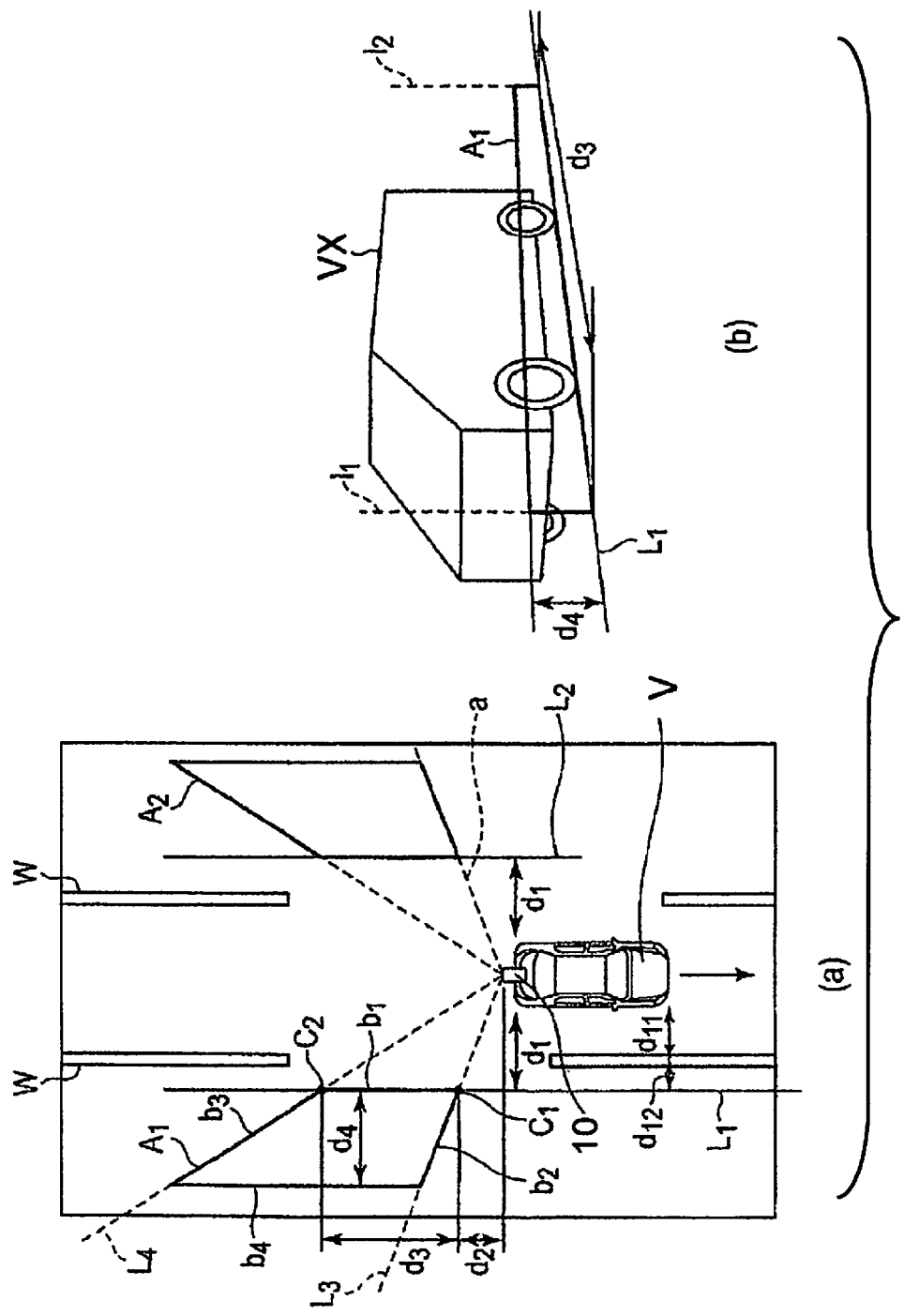
FIG. 13 is a view illustrating the driving state of the vehicle (three-dimensional object detection by the edge information) in FIG. 1, with part (a) being a plan view illustrating the positional relationship between the detection areas, and part (b) being a perspective view illustrating the positional relationship between the detection areas in real space.

Next, the detection block B for a three-dimensional object that utilizes the edge information, which is configured by a luminance difference calculation unit 35, an edge line detection unit 36, and a three-dimensional object detection unit 37 and which can be operated in lieu of block A illustrated in FIG. 3, will be described. FIG. 13 is a view illustrating the image range of the camera 10 in FIG. 3; with part (a) of FIG. 13 is a plan view, and part (b) of FIG. 13 is a perspective view in the real space rear of the host vehicle V. The camera 10 is set to a predetermined view angle a, and the rear side of the host vehicle V included in the predetermined view angle a is captured, as illustrated in part (a) of FIG. 13. The view angle a of the camera 10 is set so that the adjacent lanes are included in the capture range of the camera 10 in addition to the lane in which the host vehicle V is driving in the same manner as that illustrated in FIG. 2.

The detection areas A1, A2 in the present example are trapezoidal in a plan view (the bird's-eye view state), and the position, the size, and the shape of the detection areas A1, A2 are determined based on the distances d1 to d4. The detection areas A1, A2 of the example illustrated in the drawing are not limited to being trapezoidal, and they may also be rectangular or another shape in a bird's-eye view state, as illustrated in FIG. 2. The detection area setting unit 41 of the present embodiment is also able to set the detection areas A1, A2, using the method described above.

Here, the distance d1 is the distance from the host vehicle V to the ground lines L1, L2. The ground lines L1, L2 refer to a line in which a three-dimensional object, which is present in a lane adjacent to the lane in which the host vehicle V is driving, is in contact with the ground. In the present embodiment, an objective is to detect another vehicle VX or the like (including two-wheel vehicles or the like) driving in the left or right lane behind the host vehicle V and adjacent to the lane of the host vehicle V. Accordingly, the distance d1, which is the position of the ground lines L1, L2 of the other vehicle VX, can be determined so as to be substantially fixed from the distance d11 from the host vehicle V to a white line W and the distance d12 from the white line W to the position in which the other vehicle VX is predicted to drive.

The distance d1 is not limited to being fixed and may be variable. In this case, the computer 30 recognizes the position of the white line W in relation to the host vehicle V using white line recognition or another technique, and the distance d11 is determined based on the position of the recognized white line W. The distance d1 is thereby variably set using the determined distance d11. In the present embodiment described below, the position in which the other vehicle VX is driving (the distance d12 from the white line W) and the position in which the host vehicle V is driving (the distance d11 from the white line W) are mostly predictable, and the distance d1 is fixedly determined.

A distance d2 is the distance extending from the rear end part of the host vehicle V in the vehicle driving direction. The distance d2 is determined so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle driving direction. The distance d3 is determined based on the size of the three-dimensional object to be detected. In the present embodiment, the object to be detected is another vehicle VX or the like; therefore, the distance d3 is set to a length that includes the other vehicle VX.

The distance d4 indicates the height, which has been set so that the tires of the other vehicle VX or the like are included in real space, as illustrated in part (b) of FIG. 13. In a bird's-eye view image, the distance d4 is the length illustrated in part (a) of FIG. 13. The distance d4 may also be a length that does not include the lanes further adjacent to the left and right adjacent lanes in the bird's-eye view image (specifically, the lanes that are two lanes away). This is because when the lanes that are two lanes away from the lane of the host vehicle V are included, distinguishing whether another vehicle VX is present in the adjacent lanes to the left and right of the lane in which the host vehicle V is driving or whether another vehicle VX is present in a lane two lanes away is no longer possible.

As described above, the distances d1 to d4 are determined, and the position, the size, and the shape of the detection areas A1, A2 are thereby determined. More specifically, the position of the top side b1 of the detection areas A1, A2 that form a trapezoid is determined by the distance d1. The starting position C1 of the top side b1 is determined by the distance d2. The end position C2 of the top side b1 is determined by the distance d3. The lateral side b2 of the detection areas A1, A2 that form a trapezoid is determined by a straight line L3 that extends from the camera 10 toward the starting position C1 . Similarly, the lateral side b3 of the detection areas A1, A2 that form a trapezoid is determined by a straight line L4 that extends from the camera 10 toward the end position C2 . The position of the lower side b4 of the detection areas A1, A2 that form a trapezoid is determined by the distance d4. In this manner, the areas surrounded by the sides b1 to b4 are the detection areas A1, A2. The detection areas A1, A2 are regular squares (rectangles) in the real space rear of the host vehicle V, as illustrated in part (b) of FIG. 13.

Returning to FIG. 3, the viewpoint conversion unit 31 accepts the input of the captured image data of a predetermined area captured by the camera 10. The viewpoint conversion unit 31 converts the viewpoint of the input captured image data into bird's-eye view image data, which is a bird's-eye view state. A bird's-eye view state is a state of viewing from the viewpoint of an imaginary camera that is looking down from above, in particular, that is looking vertically downward (or slightly inclined downward). Viewpoint conversion can be carried out using the technique described in, for example, Japanese Laid-Open Patent Application No. 2008-219063.

The luminance difference calculation unit 35 calculates the luminance differences in the bird's-eye view image data, which has undergone viewpoint conversion by the viewpoint conversion unit 31, in order to detect the edges of a three-dimensional object included in the bird's-eye view image. The luminance difference calculation unit 35 calculates, for each of a plurality of positions along a perpendicular imaginary line extending along the perpendicular direction in real space, the luminance difference between two pixels near each position. The luminance difference calculation unit 35 is capable of calculating the luminance difference by a method for setting a single perpendicular imaginary line extending in the perpendicular direction in real space or by a method for setting two perpendicular imaginary lines.

The specific method for setting two perpendicular imaginary lines is described. The luminance difference calculation unit 35 sets a first perpendicular imaginary line that corresponds to a line segment extending in the perpendicular direction in real space and a second perpendicular imaginary line that is different from the first perpendicular imaginary line and that corresponds to the line segment extending in the perpendicular direction in real space, in relation to the bird's-eye view image data, which has undergone viewpoint conversion. The luminance difference calculation unit 35 determines the luminance difference between a point on the first perpendicular imaginary line and a point on the second perpendicular imaginary line in a continuous fashion along the first perpendicular imaginary line and the second perpendicular imaginary line. The operation of the luminance difference calculation unit 35 is described in detail below.

Figure 14:
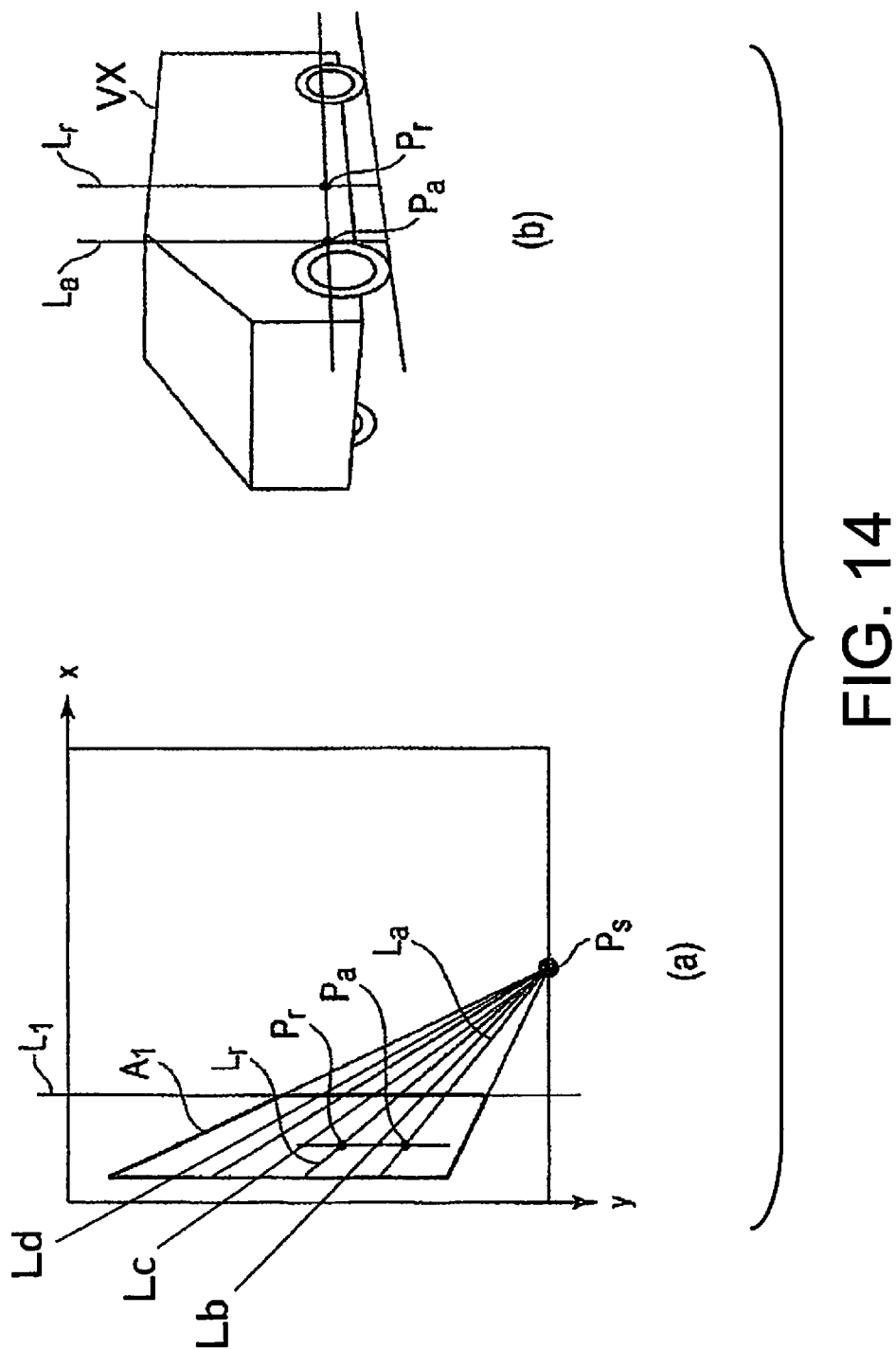
FIG. 14 is a view showing the operation of the luminance difference calculation unit in FIG. 3, with part (a) illustrating the positional relationship between the attention line, the reference line, the attention point, and the reference point in the bird's-eye view image, and part (b) the positional relationship between the attention line, the reference line, the attention point, and the reference point in real space.

The luminance difference calculation unit 35 sets a first perpendicular imaginary line La (hereinafter referred to as the attention line La) that corresponds to a line segment extending in the perpendicular direction in real space and that passes through the detection area A1, as illustrated in part (a) of FIG. 14. The luminance difference calculation unit 35 sets a second perpendicular imaginary line Lr (hereinafter referred to as the reference line Lr) that is different from the attention line La, corresponds to the line segment extending in the perpendicular direction in real space, and passes through the detection area A1. Here, the reference line Lr is set to a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the collapsing direction of the three-dimensional object when converted into a bird's-eye view.

The luminance difference calculation unit 35 sets an attention point Pa on the attention line La (a point on the first perpendicular imaginary line). The luminance difference calculation unit 35 sets a reference point Pr on the reference line Lr (a point on the second perpendicular imaginary line). The attention line La, the attention point Pa, the reference line Lr, and the reference point Pr have the relationship in real space that is illustrated in part (b) of FIG. 14. As is apparent from part (b) of FIG. 14, the attention line La and the reference line Lr are lines extending in the perpendicular direction in real space, and the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 35 determines the luminance difference between the attention point Pa and the reference point Pr. If the luminance difference between the attention point Pa and the reference point Pr is great, there is a possibility that an edge is present between the attention point Pa and the reference point Pr. Accordingly, the edge line detection unit 36 illustrated in FIG. 3 detects an edge line based on the luminance difference between the attention point Pa and the reference point Pr.

Figure 15:
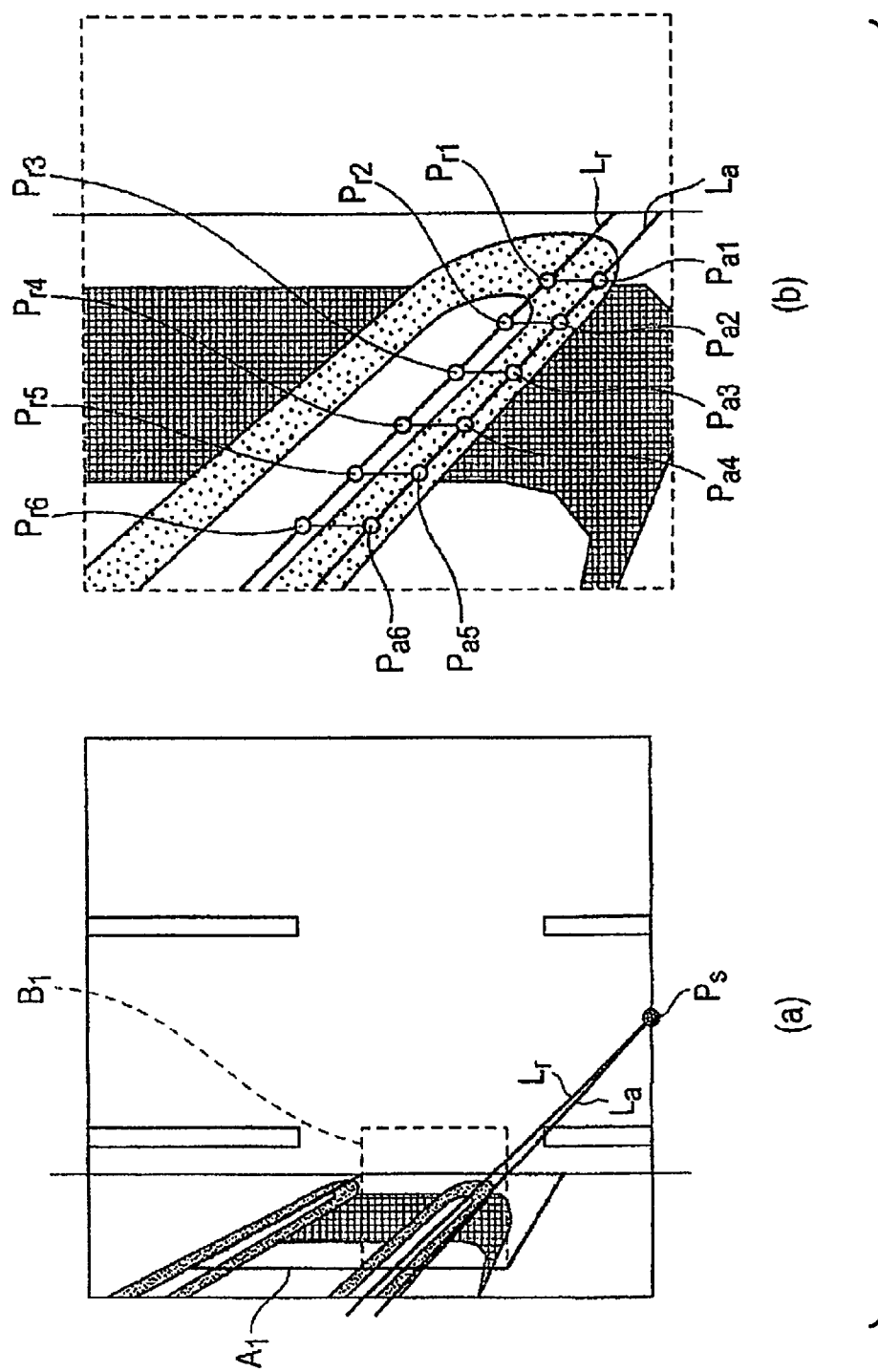
FIG. 15 is a view showing the detailed operation of the luminance difference calculation unit in FIG. 3, with part (a) illustrating the detection area in the bird's-eye view image, and part (b) illustrating the positional relationship between the attention line, the reference line, the attention point, and the reference point in the bird's-eye view image.

This point will be described in greater detail. FIG. 15 is a view showing the detailed operation of the luminance difference calculation unit 35. Part (a) of FIG. 15 illustrates a bird's-eye view image of the bird's-eye view state, and part (b) of FIG. 15 is an enlarged view of one part B1 of the bird's-eye view image illustrated in part (a) of FIG. 15. In FIG. 15, only the detection area A1 is illustrated and described, but the luminance difference is calculated using the same procedure for detection area A2.

When another vehicle VX is being displayed in the captured image captured by the camera 10, the other vehicle VX appears in the detection area A1 in the bird's-eye view image, as illustrated in part (a) of FIG. 15. The attention line La is set on a rubber portion of a tire of the other vehicle VX in the bird's-eye view image in part (b) of FIG. 15, as illustrated in the enlarged view of area B1 in part (a) of FIG. 15. In this state, first, the luminance difference calculation unit 35 sets the reference line Lr. The reference line Lr is set along the perpendicular direction in a position set at a predetermined distance in real space from the attention line La. Specifically, in the three-dimensional object detection device 1 according to the present embodiment, the reference line Lr is set in a position at a distance that is 10 cm away from the attention line La in real space. The reference line Lr is thereby set on the wheel of the tire of the other vehicle VX set, for example, at a distance that corresponds to 10 cm from the rubber of the tire of the other vehicle VX in the bird's-eye view image.

Next, the luminance difference calculation unit 35 sets a plurality of attention points PA1 to PaN on the attention line La. In part (b) of FIG. 15, six attention points PA1 to Pa6 (hereinafter referred to as the attention point Pai when indicating an arbitrary point) are set for the convenience of the description. An arbitrary number of attention points Pa may be set on the attention line La. In the description below, N attention points Pa are set on the attention line La.

The luminance difference calculation unit 35 subsequently sets the reference points Pr1 to PrN so as to have the same height as the attention points PA1 to PaN in real space. The luminance difference calculation unit 35 calculates the luminance difference between the attention point Pa and the reference point Pr pairs at the same height. The luminance difference calculation unit 35 thereby calculates the luminance difference between two pixels for each of the plurality of positions (1–N) along the perpendicular imaginary line extending in the perpendicular direction in real space. The luminance difference calculation unit 35 calculates the luminance difference between, for example, a first attention point PA1 and a first reference point Pr1 and calculates the luminance difference between a second attention point PA2 and a second reference point Pr2. The luminance difference calculation unit 35 thereby determines the luminance difference in a continuous fashion along the attention line La and the reference line Lr. In other words, the luminance difference calculation unit 35 sequentially determines the luminance difference between the third to the $N^{th}$ attention points Pa3 to PaN and the third to $N^{th}$ reference points Pr3 to PrN.

The luminance difference calculation unit 35 repeats the operation of setting the above-described reference line Lr, setting the attention point Pa, setting the reference point Pr, and calculating the luminance difference while shifting the attention line La within the detection area A1. In other words, the luminance difference calculation unit 35 repeatedly executes the above-described operation while changing the positions of the attention line La and the reference line Lr by the same distance in real space along the direction in which the ground line L1 extends. The luminance difference calculation unit 35 specifically sets the line that was the reference line Lr in the previous process to be the attention line La, sets the reference line Lr in relation to the attention line La, and sequentially determines the luminance difference.

Returning to FIG. 3, the edge line detection unit 36 detects the edge line from the continuous luminance difference calculated by the luminance difference calculation unit 35. For example, in the case illustrated in part (b) of FIG. 15, the first attention point PA1 and the first reference point Pr1 are positioned at the same tire portion, and the luminance difference is therefore small. On the other hand, the second to the sixth attention points PA2 to Pa6 are positioned at the rubber portions of the tire, and the second to sixth reference points Pr2 to Pr6 are positioned at the wheel portions of the tire. Therefore, the luminance difference between the second to sixth attention points PA2 to Pa6 and the second to sixth reference points Pr2 to Pr6 is great. Accordingly, the edge line detection unit 36 is capable of detecting that an edge line is present between the second to the sixth attention points PA2 to Pa6 and the second to sixth reference points Pr2 to Pr6 where the luminance difference is high.

Specifically, when an edge line is to be detected, the edge line detection unit 36 first assigns an attribute to the $i^{th}$ attention point Pai from the luminance difference between the $i^{th}$ attention point Pai (with coordinates (xi, yi)) to the $i^{th}$ reference point Pri (with coordinates (xi', yi')) in accordance with formula 1 noted below.

When $1(xi,yi) > 1(xi',yi') + t$ $s(xi,yi) = 1$

When $1(xi,yi) < 1(xi',yi') - t$ $s(xi,yi) = -1$ when the above does not hold true $s(xi,yi) = 0$         Formula 1

In formula 1 above, t represents a threshold value, I(xi, yi) represents the luminance value of the $i^{th}$ attention point Pai, and I(xi', yi') represents the luminance value of the $i^{th}$ reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above.

Next, the edge line detection unit 36 assesses whether the ention line La is an edge line from the continuity c(xi, yi) of the attribute s along the attention line La based on the following formula 2.

When $s(xi,yi) = s(xi+1, yi+1)$ (and excluding 0=0), $c(xi,yi) = 1$ when the above do not hold true;

$c(xi,yi) = 0$         Formula 2

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 36 determines the sum of the continuities c of all of the attention points Pa on the attention line La. The edge line detection unit 36 divides the sum of the continuities c thus determined by the number N of the attention points Pa to thereby normalize the continuity c. The edge line detection unit 36 determines the attention line La to be an edge line when the normalized value has exceeded a threshold value θ. The threshold value θ is set in advance by experimentation or by another means.

In other words, the edge line detection unit 36 determines whether the attention line La is an edge line based on formula 3 noted below. The edge line detection unit 36 then determines whether all of the attention lines La drawn on the detection area A1 are edge lines.

$$\Sigma c(xi,yi)/N > \theta \qquad \text{Formula 3}$$

Returning to FIG. 3, the three-dimensional object detection unit 37 detects a three-dimensional object based on the quantity of edge lines detected by the edge line detection unit 36. As described above, the three-dimensional object detection device 1 according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 37 detects a three-dimensional object based on the quantity of the edge lines that have been detected by the edge line detection unit 36. Furthermore, prior to detecting the three-dimensional object, the three-dimensional object detection unit 37 assesses whether the edge lines detected by the edge line detection unit 36 are correct. The three-dimensional object detection unit 37 assesses whether a change in luminance of the edge lines is a predetermined threshold value or greater along the edge lines of the bird's-eye view image. When the change in luminance of the edge lines in the bird's-eye view image is at a threshold value or greater, the edge lines are determined to have been detected by an erroneous assessment. On the other hand, when the change in the luminance of the edge lines in the bird's-eye view image is not greater than a threshold value, the assessment is that the edge lines are correct. The threshold value is set in advance by experimentation or by another means.

Figure 16:
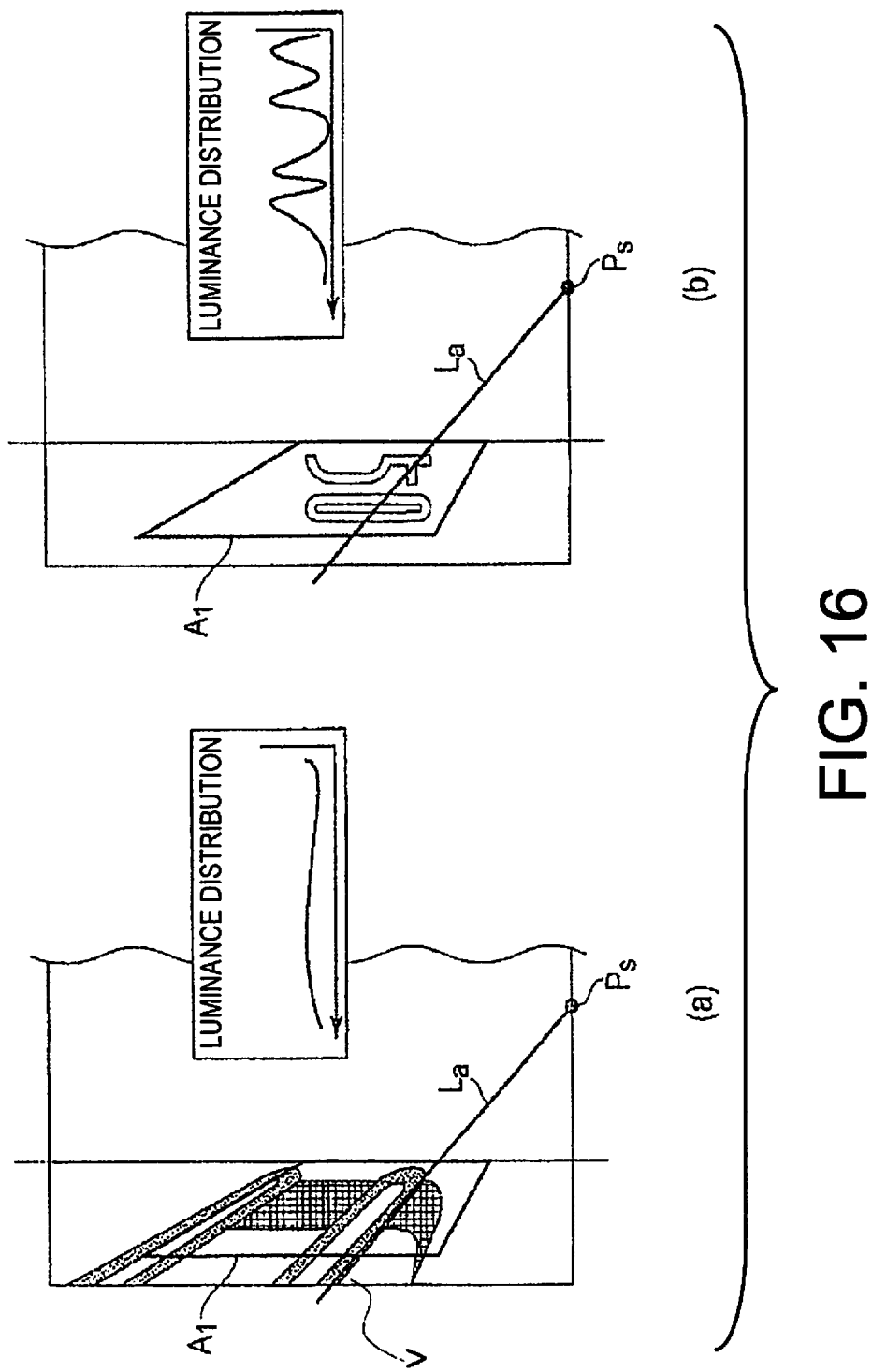
FIG. 16 is a view illustrating the edge line and the luminance distribution on the edge line, with part (a) is a view illustrating the luminance distribution when a three-dimensional object (a vehicle) is present in the detection area, and part (b) is a view illustrating the luminance distribution when a three-dimensional object is not present in the detection area.

FIG. 16 is a view illustrating the luminance distribution on the edge line; FIG. 16(a) illustrates the edge line and the luminance distribution when another vehicle VX as a three-dimensional object is present in the detection area A1, and FIG. 16(b) illustrates the edge line and the luminance distribution when a three-dimensional object is not present in the detection area A1.

As illustrated in part (a) of FIG. 16, the assumption is that a determination has been made that the attention line La set on the tire rubber portion of the other vehicle VX is an edge line in the bird's-eye view image. In this case, the change in the luminance of the attention line La in the bird's-eye view image is gradual. This is due to the image captured by the camera 10 being converted from viewpoint into a bird's-eye view image, whereby the tire of the other vehicle VX is enlarged within the bird's-eye view image. On the other hand, the attention line La that is set in the white character portion "50" drawn on the road surface in the bird's-eye view image is assumed to have been erroneously assessed to be an edge line, as illustrated in part (b) of FIG. 16. In this case, the change in the luminance of the attention line La in the bird's-eye view image has considerable undulations. This is because the road and the other portions of low luminance are mixed with the portions of high luminance in the white characters on the edge line.

The three-dimensional object detection unit 37 assesses whether an edge line has been detected by an erroneous assessment based on the differences in the luminance distribution on the attention line La as described above. The three-dimensional object detection unit 37 determines that the edge line has been detected by an erroneous assessment when the change in luminance along the edge line is at a predetermined threshold value or greater. Then, the edge line is not used for the detection of a three-dimensional object. A reduction in the precision of the detection of a three-dimensional object is thereby suppressed when white characters such as a "50" on the road surface, roadside vegetation, and the like are assessed to be edge lines.

Specifically, the three-dimensional object detection unit 37 calculates the change in the luminance of the edge line using formula 4 or 5 noted below. The change in the luminance of the edge line corresponds to the evaluation value in real space in the perpendicular direction. Formula 4 evaluates the luminance distribution using the total value of the square of the difference between the $i^{th}$ luminance value $I(xi, yi)$ and the adjacent $i^{th}+1$ luminance value $I(xi+1, yi+1)$ on the attention line La. Formula 5 evaluates the luminance distribution using the total value of the absolute value of the difference between the $i^{th}$ luminance value $I(xi, yi)$ and the adjacent $i^{th}+1$ luminance value $I(xi+1, yi+1)$ on the attention line La.

$$\text{Evaluation value in the perpendicular equivalent direction} = \Sigma[\{I(xi,yi) - I(xi+1, yi+1)\}2] \qquad \text{Formula 4}$$

$$\text{Evaluation value in the perpendicular equivalent direction} = \Sigma|I(xi,yi) - I(xi+1, yi+1)| \qquad \text{Formula 5}$$

No limitation is imposed in the use of formula 5; also, binarizing an attribute b of an adjacent luminance value using a threshold value t2 and then adding the binarized attribute b for all of the attention points Pa, as in formula 6 noted below, is possible.

Evaluation value in the perpendicular equivalent direction=$\Sigma b(xi,yi)$

However, when $|I(xi,yi)-I(xi+1,yi+1)| > t2$ $b(xi,yi)=1$ when the above does not hold true.

$b(xi,yi)=0$ [Formula 6]

The attribute $b(xi, yi)$ of the attention point $Pa(xi, yi)$ is '1' when the absolute value of the luminance difference between the luminance value of the attention point Pai and the luminance value of the reference point Pri is greater than a threshold value t2. When the above relationship does not hold true, the attribute $b(xi, yi)$ of the attention point Pai is '0.' The threshold value t2 is set in advance by experimentation or by another means so that the attention line La is not assessed to be on the same three-dimensional object. The three-dimensional object detection unit 37 then adds the attribute b for all of the attention points Pa on the attention line La and determines the evaluation value in the perpendicular equivalent direction to thereby assess whether an edge line is correct.

Figure 17:
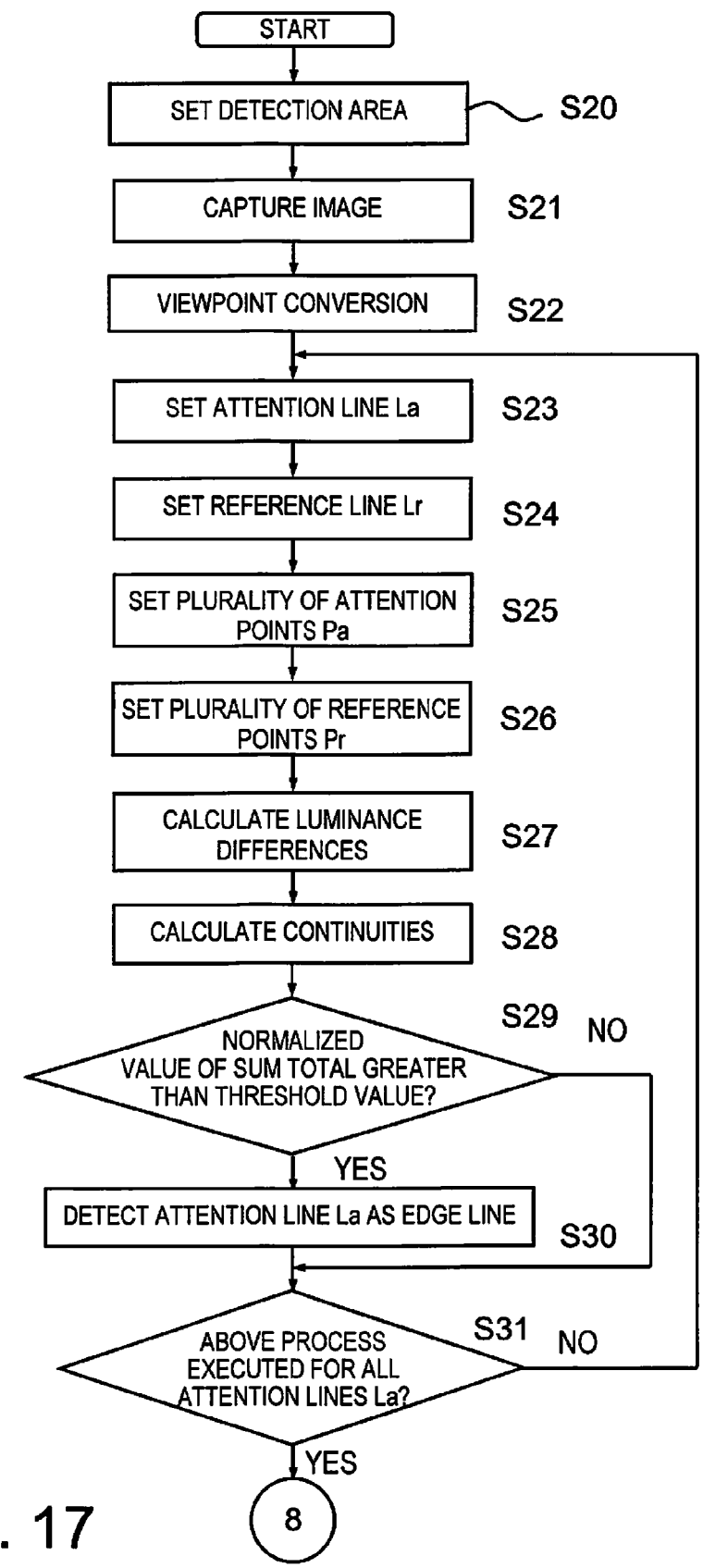
FIG. 17 is a first part of a flowchart illustrating the three-dimensional object detection method using the edge information that is executed by the viewpoint conversion unit, the luminance difference calculation unit, the edge line detection unit, and the three-dimensional object detection unit in FIG. 3.
Figure 18:
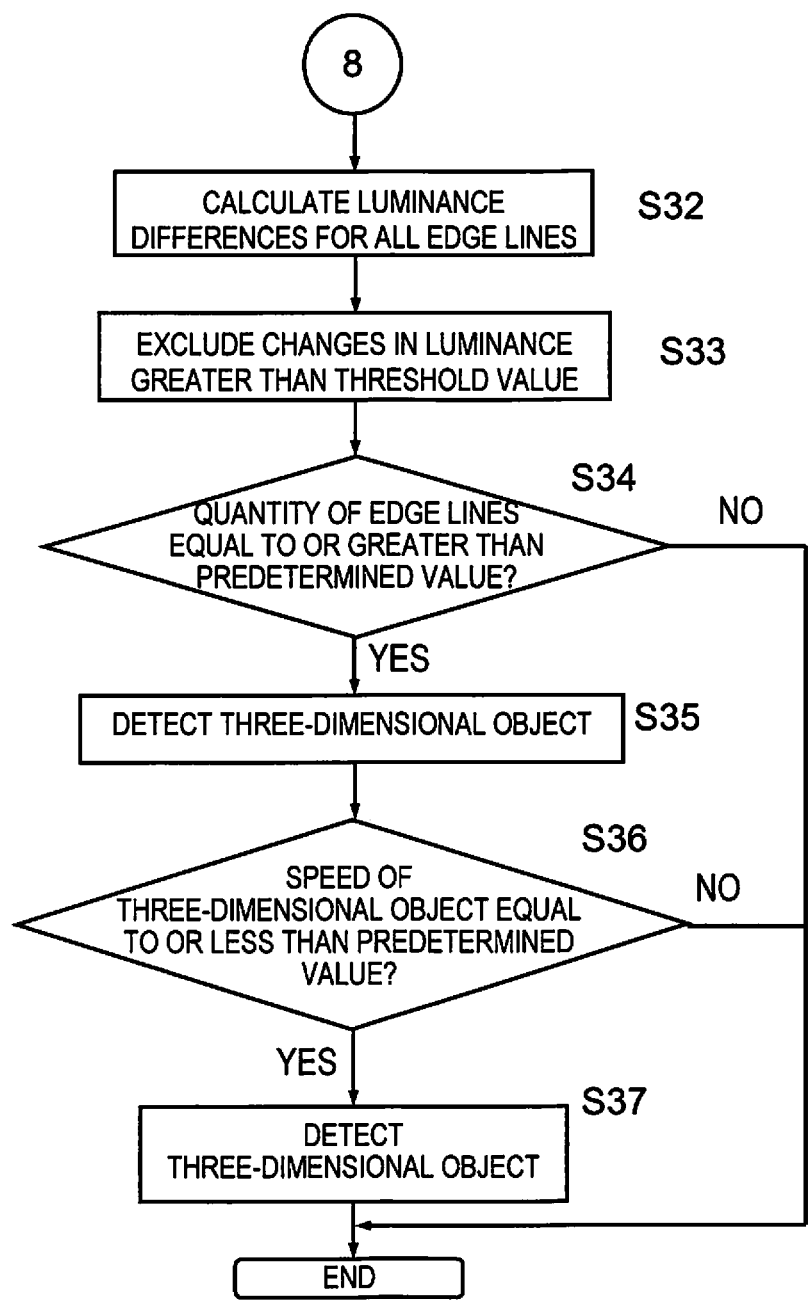
FIG. 18 is a second part of a flowchart illustrating the three-dimensional object detection method using the edge information that is executed by the viewpoint conversion unit, the luminance difference calculation unit, the edge line detection unit, and the three-dimensional object detection unit in FIG. 3.

Described next is the method for detecting a three-dimensional object that utilizes the edge information according to the present embodiment. FIG. 17 and FIG. 18 are flowcharts illustrating the details of the method for detecting a three-dimensional object according to the present embodiment. In FIG. 17 and FIG. 18, the operation associated with detection area A1 will be described for the sake of convenience, but the same operation is also executed for the detection area A2.

As illustrated in FIG. 17, first, in Step S20, the computer 30 sets the detection area based on a predetermined rule. The method for setting and changing this detection area will be described in detail below. The camera 10 then captures a predetermined area specified by the view angle a and the attaching position in Step S21. Next, the captured image data captured by the camera 10 in Step S21 is input into the viewpoint conversion unit 31, which then conducts viewpoint conversion and generates the bird's-eye view image data in Step S22.

Next, in Step S23, the luminance difference calculation unit 35 sets the attention line La on the detection area A1. At this time, the luminance difference calculation unit 35 sets a line corresponding to a line extending in the perpendicular direction in real space as the attention line La. Next, in Step S24, the luminance difference calculation unit 35 sets the reference line Lr on the detection area A1. The luminance difference calculation unit 35 sets, as the reference line Lr, a line that corresponds to a line extending in the perpendicular direction in real space and a line that is also separated by a predetermined distance in real space from the attention line La.

Next, the luminance difference calculation unit 35 sets a plurality of attention points Pa on the attention line La in Step S25. At this time, the luminance difference calculation unit 35 sets a certain number of attention points Pa that will not be problematic during edge detection by the edge line detection unit 36. The luminance difference calculation unit 35 subsequently sets the reference points Pr so that the attention points Pa and the reference points Pr have the same height in real space in Step S26. The attention points Pa and the reference points Pr thereby substantially line up in the horizontal direction, and the edge line extending in the perpendicular direction in real space is more readily detected.

Next, in Step S27, the luminance difference calculation unit 35 calculates the luminance difference between the attention points Pa and the reference points Pr at the same height in real space. The edge line detection unit 36 calculates the attribute s of the attention points Pa in accordance with formula 1 described above. In Step S28, the edge line detection unit 36 then calculates the continuity c of the attribute s of the attention points Pa in accordance with formula 2 described above. In Step S29, the edge line detection unit 36 also assesses whether a value obtained by normalizing the sum of the continuity c is greater than a threshold value θ in accordance with formula 3 described above. When a determination has been made that the normalized value is greater than the threshold value θ (Step S29: Yes), the edge line detection unit 36 detects the attention line La as the edge line in Step S30. The operation then proceeds to Step S31. When a determination has been made that the normalized value is not greater than the threshold value θ (Step S29: No), the edge line detection unit 36 does not detect that the attention line La as an edge line, and the operation proceeds to Step S31.

In Step S31, the computer 30 determines whether the operations of Steps S23 to S30 have been executed for all of the attention lines La that can be set on the detection area A1. When a determination has been made that the above operations have not been carried out for all of the attention lines La (Step S31: No), the operation returns to Step S23, sets a new attention line La, and repeats the operation through Step S31. On the other hand, when a determination has been made that the operations have been carried out for all of the attention lines La (Step S31=Yes), the operation proceeds to Step S32 in FIG. 18.

In Step S32 in FIG. 18, the three-dimensional object detection unit 37 calculates the change in luminance along the edge line for each edge line detected in Step S30 in FIG. 17. The three-dimensional object detection unit 37 calculates the change in luminance of edge lines in accordance with any of formulas 4, 5, and 6. Next, in Step S33, the three-dimensional object detection unit 37 excludes, from among the edge lines, the edge lines for which the change in luminance is at a predetermined threshold value or greater. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value is determined by experimentation or by another means in advance and is set based on the change in luminance that occurs due to characters on the road surface, roadside vegetation, and the like.

Next, in Step S34, the three-dimensional object detection unit 37 determines whether the quantity of edge lines is a second threshold value β or greater. For example, the second threshold value β is set in advance by experimentation or by another means, based on the number of edge lines of a four-wheel vehicle that appeared in the detection areas A1 when a four-wheel vehicle is set as the three-dimensional object to be detected. When an assessment has been made that the quantity of edge lines is at the second threshold value β or greater (S34: Yes), the three-dimensional object detection unit 37 determines that a three-dimensional object is present in the detection area A1 in Step S35. On the other hand, when an assessment has been made that the quantity of edge lines is not at the second threshold value β or greater (Step S34: No), the three-dimensional object detection unit 37 determines that a three-dimensional object is not present in the detection area A1. Then, the operation illustrated in FIG. 17 and FIG. 18 ends. The detected three-dimensional object may be determined to be another vehicle VX that drives in an adjacent lane that is adjacent to the lane in which the host vehicle V is driving, or a determination regarding whether or not this object is another vehicle VX that drives in an adjacent lane can be made by taking into account the relative speed of the detected three-dimensional object in relation to the host vehicle V.

As described above, according to the method of the present embodiment for detecting a three-dimensional object that utilizes the edge information, a perpendicular imaginary line is set as a line segment extending in the perpendicular direction in real space in relation to the bird's-eye view image in order to detect a three-dimensional object present in the detection areas A1, A2. Then, the luminance difference between two pixels near each position is calculated for each of a plurality of positions along the perpendicular imaginary line; as a result, assessing the presence/absence of a three-dimensional object based on the continuity of the luminance difference is possible.

Specifically, an attention line La that corresponds to a line segment extending in the perpendicular direction in real space and a reference line Lr that is different from the attention line La are set in relation to the detection areas A1, A2 in the bird's-eye view image. Then, the luminance difference between an attention point Pa on the attention line La and a reference point Pr on the reference line Lr are determined in a continuous fashion along the attention line La and the reference line La. The luminance difference between the attention line La and the reference line Lr is determined by determining the luminance difference between the points in this manner. There is a high possibility that there is an edge of a three-dimensional object in the location where the attention line La has been set when the luminance difference between the attention line La and the reference line Lr is high. Accordingly, detecting a three-dimensional object based on the continuous luminance difference is possible. In particular, the operation for detecting a three-dimensional object will not be affected, even when the three-dimensional object is enlarged in accordance with the height from the road surface by conversion to a bird's-eye view image in order compare the luminance between the perpendicular imaginary lines extending in the perpendicular direction in real space. Therefore, according to the present example, the precision for detecting a three-dimensional object can be enhanced.

In addition, in the present example, the luminance difference between two points at substantially the same height near the perpendicular imaginary line is determined. Specifically, determining the luminance difference from the attention point Pa on the attention line La and the reference point Pr on the reference line Lr, which are at substantially the same height in real space, allows the luminance difference to be distinctly detected when an edge extending in the perpendicular direction is present.

Figure 19:
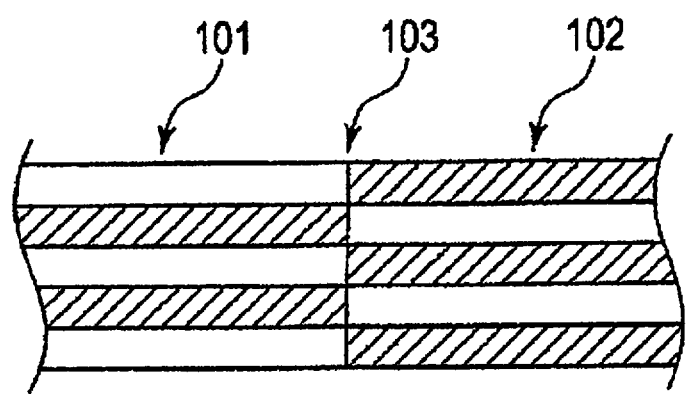
FIG. 19 is a view illustrating an image example that shows an edge detection operation.

Furthermore, in the present example, an attribute is assigned to the attention point Pa based on the luminance difference between the attention point Pa on the attention line La and the reference point Pr on the reference line Lr; then, a determination is made regarding whether the attention line La is an edge line based on the continuity c of the attributes along the attention line La. Therefore, the boundaries between the areas having high luminance and the areas having low luminance are detected as edge lines, and the edges can be detected in accordance with the natural senses of a human. The results of the above will be described. FIG. 19 is a view illustrating an image example showing the processing of the edge line detection unit 36. This image example is an image in which a first stripe pattern 101, indicating a stripe pattern in which the areas of high luminance and the areas of low luminance are repeated, and a second stripe pattern 102, indicating a stripe pattern in which the areas of low luminance and the areas of high luminance are repeated, are adjacent to each other. Also, in this image example, the areas with the first stripe pattern 101 in which the luminance is high and the areas with the second stripe pattern 102 in which the luminance is low are adjacent to each other; also, the areas with the first stripe pattern 101 in which the luminance is low and the areas with the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by the luminance difference. However, in addition to the luminance difference at the location 103, the edge line detection unit 36 assesses the location 103 to be an edge line only when there is continuity in the attributes of the luminance difference. Therefore, the edge line detection unit 36 is capable of suppressing an erroneous assessment in which the location 103, which is not recognized as an edge line by human senses, is recognized as an edge line, and the edges can be detected by human senses.

Additionally, in the present example, a determination is made that the edge line has been detected by an erroneous assessment when the change in luminance along the edge line, which is detected by the edge line detection unit 36, is at a predetermined threshold value or greater. A three-dimensional object included in a captured image tends to appear in an enlarged state in a bird's-eye view image when the captured image acquired by the camera 10 is converted into a bird's-eye view image. For example, when the tire of another vehicle VX is enlarged as described above, changes in the luminance of the bird's-eye view image in the enlarged direction tend to be small because the tire as a single location is enlarged. In contrast, when a character or the like drawn on the road surface has been erroneously assessed to be an edge line, areas such as the character portion that have high luminance and areas such as the road surface portion that have low luminance are included in the bird's-eye view image in an intermixed fashion. In such a case, the changes in luminance in the enlarged direction tend to be greater. Therefore, recognizing the edge lines that have been determined by an erroneous assessment and enhancing the precision for detecting a three-dimensional object is possible by determining the change in luminance in the bird's-eye view image along the edge line as in the present example.

Final Determination of the Three-Dimensional Object

Returning to FIG. 3, the three-dimensional object detection device 1 of the present example is provided with the two three-dimensional object detection unit 33 (or a three-dimensional object detection unit 37) described above, a three-dimensional object assessment unit 34, a lens state assessment unit 38, a detection area setting unit 41, and a controller 39. The three-dimensional object assessment unit 34 ultimately determines whether or not a detected three-dimensional object is another vehicle VX in the detection areas A1, A2, based on the detection results from the three-dimensional object detection unit 33 (or the three-dimensional object detection unit 37). When the second detection areas A12, A22, the positions of which have been changed by the detection area setting unit 41, are set, a determination is made regarding whether or not there is another vehicle VX in the second detection areas A12, A22 after the change. In addition, the controller 39 of the three-dimensional object detection device 1 according to the present embodiment controls the processing content of the three-dimensional object detection unit 33 (or the three-dimensional object detection unit 37) and/or the three-dimensional object assessment unit 34, based on the detection results for the second detection areas A12, A22, the positions of which have been changed by the detection area setting unit 41, and for the original first detection areas A11, A21.

The processing of the detection area setting unit 41 according to the present embodiment will be specifically described. When a determination has been made by the lens state assessment unit 38 that the lens 11 is in a wet state, the detection area setting unit 41 of the present embodiment sets the second detection areas A12, A22 in positions that are different from the original first detection areas A11, A21.

First, the lens state assessment unit 38 for determining the state of the lens 11 is described.

The lens state assessment unit 38 according to the present embodiment detects a state in which the lens 11 is wet from raindrops or cleaning liquid. Specifically, the lens state assessment unit 38 assesses the rainfall state and detects the state in which raindrops have adhered to the outside of the body of the host vehicle V and especially to the lens 11 of the camera 10, as well as the amount of raindrops (the rainfall amount) adhered to the lens 11, based on the information obtained from one device or more among a raindrop sensor 50, a wiper 60, and a navigation device 70. In addition, the lens state assessment unit 38 detects the state in which the cleaning liquid has adhered to the lens 11, as well as the amount of cleaning liquid adhered to the lens 11, based on the time at which a lens cleaning device 80, which is provided with a pump that supplies cleaning liquid and a nozzle that sprays the supplied cleaning liquid onto the lens 11 and which sprays the cleaning liquid onto the lens 11 at a predetermined time in accordance with a predetermined lens cleaning step in order to clean the lens 11 of the camera 10, sprays the cleaning liquid onto the lens 11 in a cleaning treatment step.

The raindrop sensor 50 in the present embodiment is provided with a stage configured by a translucent material, such as glass, and to which raindrops can adhere, a light emitting part that irradiates infrared light onto the stage, and a light receiving part that receives the reflected light of the light that is irradiated from the light emitting part. When raindrops have not adhered to the exposed surface of the stage, the light irradiated from the light emitting part is completely reflected by the surface of the stage (the glass), so that the light receiving part receives reflected light that is substantially the same intensity as the irradiated light. On the other hand, when raindrops have adhered to the exposed surface of the stage, the light irradiated from the light emitting part is transmitted outside via the raindrops that have adhered to the stage (the glass), so that the light receiving part receives reflected light with an attenuated intensity, as compared to the irradiated light. Determining whether or not raindrops have adhered to the exposed surface of the stage (the one main surface) by comparing the irradiated light that is irradiated from the light emitting part and the reflected light that is received by the light receiving part is possible. In addition, the amount of raindrops is determined based on the attenuation of the irradiated light. Information regarding the presence/absence of raindrops as the amount of raindrops is sent to the lens state assessment unit 38 of the computer 30 described below. The configuration of the raindrop sensor 50 is not thus limited; other raindrop sensors 50 known at the time of the application may be appropriately used. The lens state assessment unit 38 determines whether or not the lens 11 is in a wet state, based on the output result of the raindrop sensor 50 (the presence/absence of raindrops, the presence of raindrops of a predetermined amount or more).

The wiper 60 is a device for removing raindrops on the windshield and the rear window of the host vehicle V. Regardless of being set to manual or to auto, the more the adhered amount of raindrops, the faster the wiper 60 will wipe the glass (or windshield). Using this, determining that the quantity of raindrops is greater when the drive frequency (the drive strength) of the wiper 60 is higher is possible, and determining that the quantity of raindrops is smaller (a little rainfall amount) when the drive frequency (the drive strength) of the wiper 60 is lower is possible. The lens state assessment unit 38 determines whether or not the lens 11 is in a wet state based on the operation information of the wiper 60 (information that the wiper is in operation and that operation occurs at a predetermined drive frequency or greater).

The navigation device 70 is provided with a communication device 71 that exchanges information with the outside and that functions as a device that not only can perform route search but also provides various information, including weather information, which includes rainfall information corresponding to the position information, from an information providing server, in the same way as with a common information providing server known at the time of the application. The rainfall information to be acquired includes the presence/absence of rainfall, as well as whether there is more or less rainfall. The navigation device 70 detects the current position of the host vehicle V using a GPS device 72 and acquires the weather information, including rainfall information at the current position. As a result, acquiring information regarding the presence/absence of rainfall (the raindrop adhesion) and the amount of rainfall from the outside is possible.

The lens cleaning device 80 is provided with a pump that supplies cleaning liquid and a nozzle that sprays the supplied cleaning liquid onto the lens 11, and the lens cleaning device sprays the cleaning liquid onto the lens 11 at a predetermined time in accordance with a predetermined lens cleaning step in order to clean the lens 11 of the camera 10. In this lens cleaning step, the lens cleaning device 80 cleans the surface of the lens 11 in accordance with a lens cleaning step, including a "lens wetting step A" in which a cleaning liquid W is dropped onto the lens 11 in order to wet the surface of the lens 11; a "first air blowing Step B" in which gas is intermittently blown onto the lens 11 a plurality of times at a predetermined interval; a "cleaning Step C" in which the cleaning liquid W is blown onto the lens 11 to clean the lens 11 surface; and a "second air blowing Step D" in which the cleaning liquid W is evaporated and the surface of the lens 11 is dried. The lens state assessment unit 38 refers to the lens cleaning step and determines that the lens 11 is wet while the "lens wetting Step A" in which the cleaning liquid is dropped onto the lens 11 and the "cleaning Step C" in which the cleaning liquid is blown onto the lens 11 are being executed, based on the elapsed time after starting the lens cleaning step.

As described above, the lens state assessment unit 38 determines whether or not the lens 11 is wet based on the information acquired from the raindrop sensor 50, the wiper 60, the navigation device 70, or the lens cleaning device 80 and outputs the result to the detection area setting unit 41.

When a determination is made by the lens state assessment unit 38 that the lens 11 is in a wet state, the detection area setting unit 41 changes the positions of the first detection areas A11, A21, which are first set as detection areas A1, A2, so that they do not include a display area of a white line on the driving lane side of the host vehicle V among the white lines on the adjacent lane, which is adjacent to the lane in which the host vehicle V drives, and sets the second detection areas A12, A22 as the new detection areas A1, A2.

Figure 20:
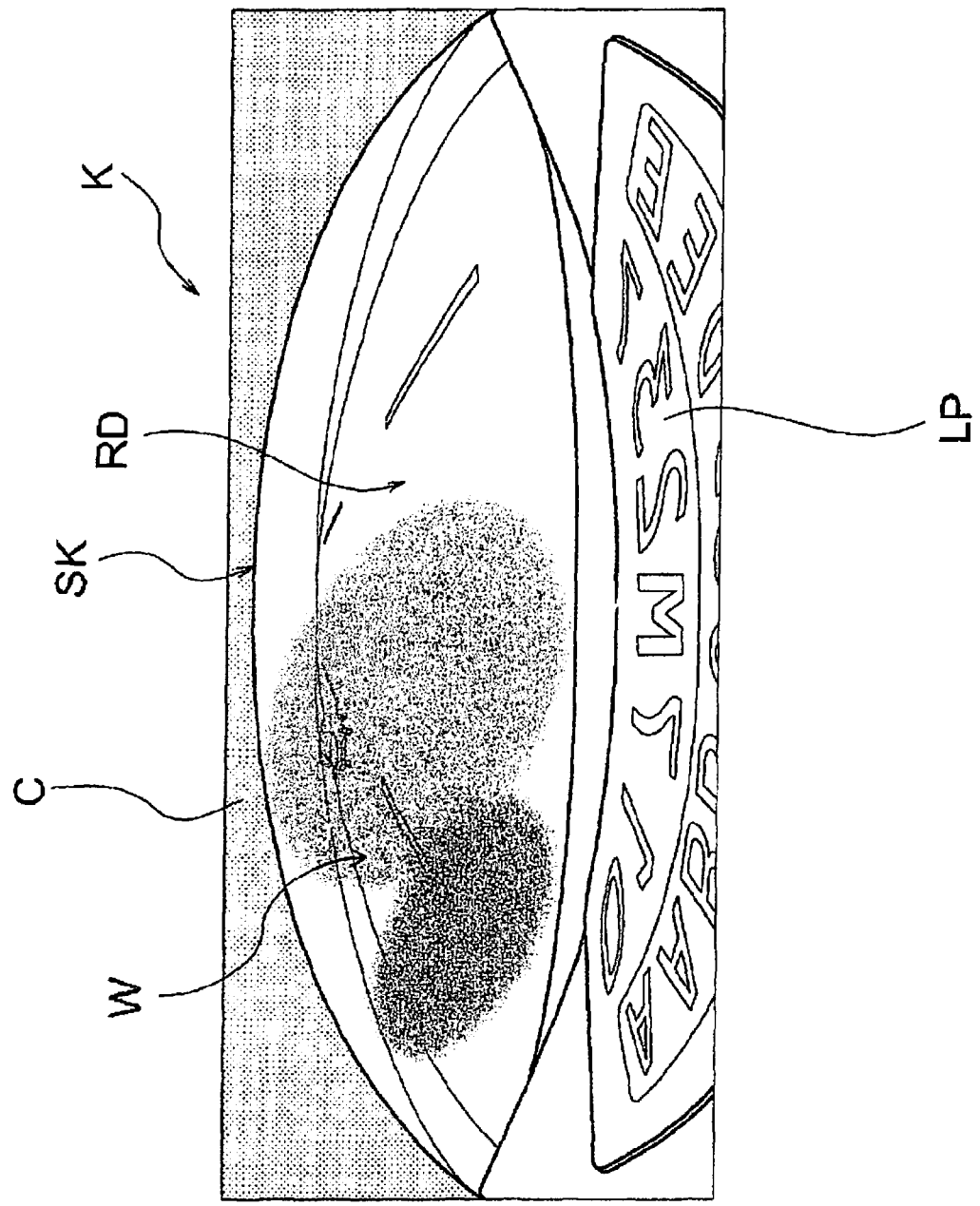
FIG. 20 is a view illustrating an example of a captured image of a camera.

Meanwhile, if liquid such as water or cleaning liquid adheres to the lens 11 and the lens 11 is in a wet state, the image that is formed by the lens 11 will be distorted. An example of image information K acquired via a wet lens 11 is illustrated in FIG. 20. The image on the lower side of FIG. 20 is an image of the license plate LP, and the gray portion on the upper side is an image of a case C of the camera 10. The image in the area between the license plate LP and the case C changes moment by moment along with the movement of the host vehicle V. The image information K of the area between the license plate LP and the case C includes an image of a road surface RD of the road on which the host vehicle V drives and an image of the rearward sky SK expanding above this road surface RD, as illustrated in FIG. 20.

When the image conversion process is conducted using the image information K captured via a wet lens 11, such as that illustrated in FIG. 20, there are cases in which the edges of a planar object will have the characteristic of the edges of a three-dimensional object due to the effect of the water film that covers the lens 11. If the differential waveform information or the edge information is calculated using the method described above based on this type of image information and three-dimensional object detection is carried out, there are cases in which a planar object, such as a white line on the road (the driving lane marker), is erroneously recognized as an image of a three-dimensional object, such as another vehicle VX.

Figure 21:
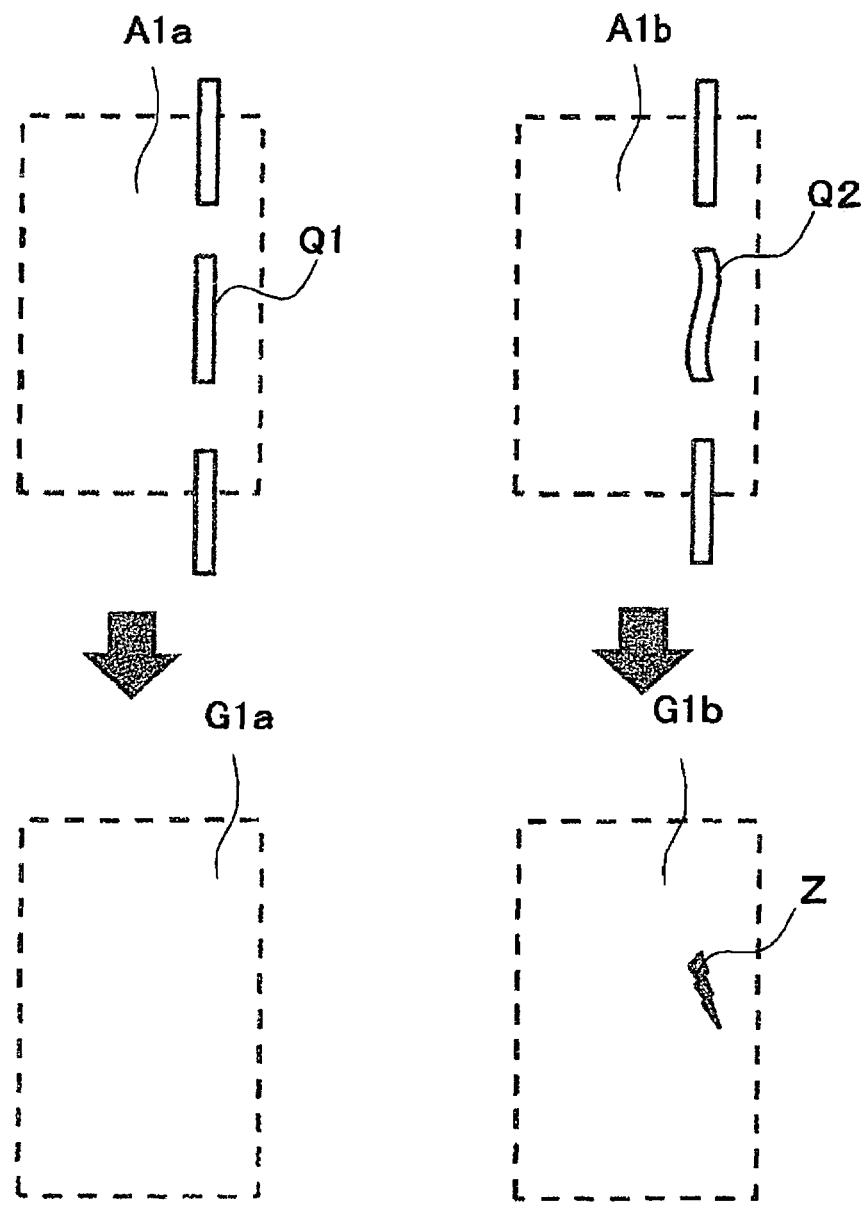
FIG. 21 is a view showing the information that is generated in the case that a white line is distorted.

As specifically illustrated by the left side drawing in FIG. 21, when a lens 11 that is not wet is used to capture a detection area A1a in which a white line Q1 is drawn, and when the differential waveform information (the edge information) is determined based on this captured image, the characteristic of the white line Q1, which is a planar object, will not be extracted as illustrated by G1a. On the other hand, as illustrated by the right side drawing in FIG. 21, a white line Q2 is distorted when a wet lens 11 is used to capture a detection area A1b in which the white line Q2 is drawn; therefore, if the differential waveform information (the edge information) is determined based on this captured image, there are cases in which a characteristic Z of a three-dimensional object will be extracted as illustrated by G1b, even though the captured objects are only planar objects. If the three-dimensional object detection process is carried forward based on this detection result, there are cases in which an image of a white line will be detected as another vehicle VX.

In order to prevent this type of erroneous detection, the three-dimensional object detection device 1 according to the present embodiment sets the second detection areas A12, A22 in positions that are different from the default first detection areas A11, A21 when a wet state of the lens 11 has been detected. These second detection areas A12, A22 are set by changing positions so that they do not include a display area of a white line on the driving lane side of the host vehicle V among the white lines in the adjacent lanes, which are adjacent to the lane in which the host vehicle V drives, so that eliminating the effect of the distorted image of the white line captured by the wet lens 11 is possible. As a result, preventing a reduction in the precision of the detection results caused by the lens 11 becoming wet is possible, and providing a three-dimensional object detection device 1 that detects another vehicle that drives in an adjacent lane with a high degree of precision is possible.

The specific method for setting the second detection areas A12, A22 will be described below based on FIG. 22 to FIG. 25.

Figure 22:
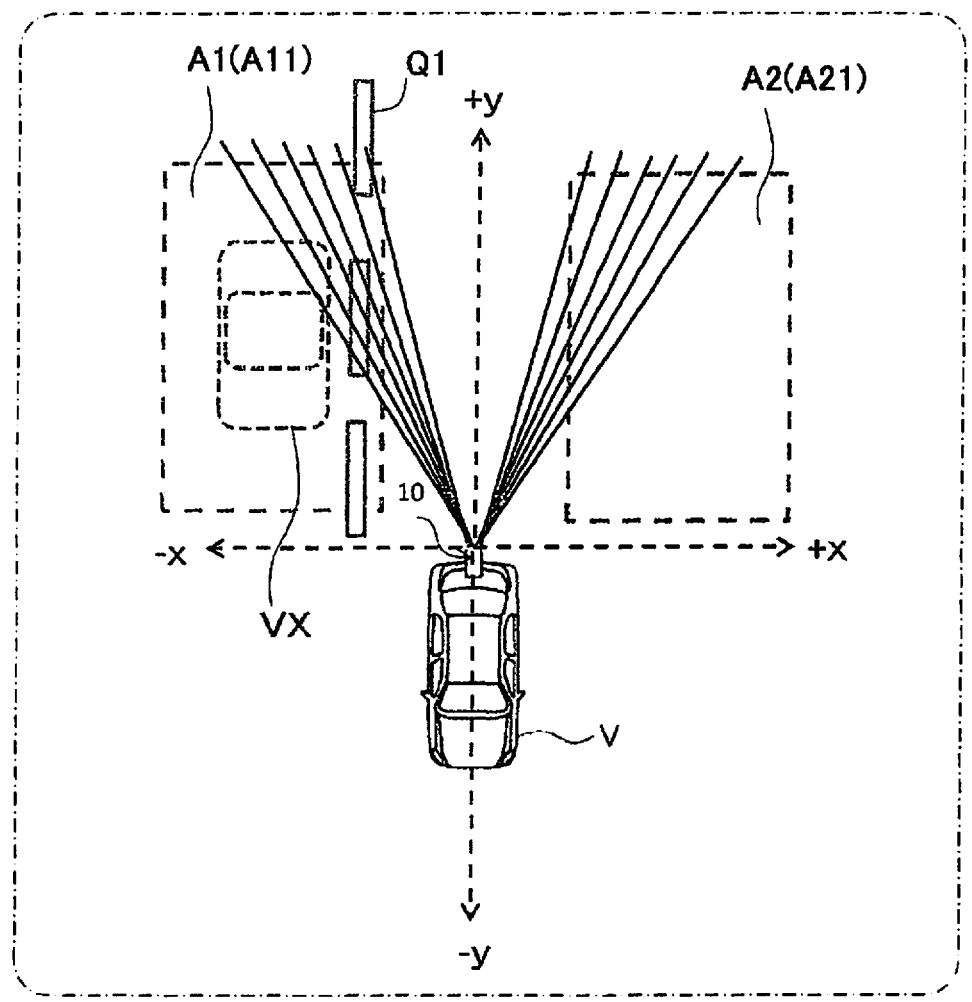
FIG. 22 is a view illustrating an example of a default first detection area.

FIG. 22 illustrates the first detection areas A11, A21, which are first set as the detection areas A1, A2. The first detection areas A11, A21 are set in positions that include another vehicle VX that is driving in the driving lane of an adjacent lane and a white line that indicates the position of the driving lane of the adjacent lane. The positions of the first detection areas A11, A21 may be defined as positions where constant processing is carried out (the default positions).

Figure 23:
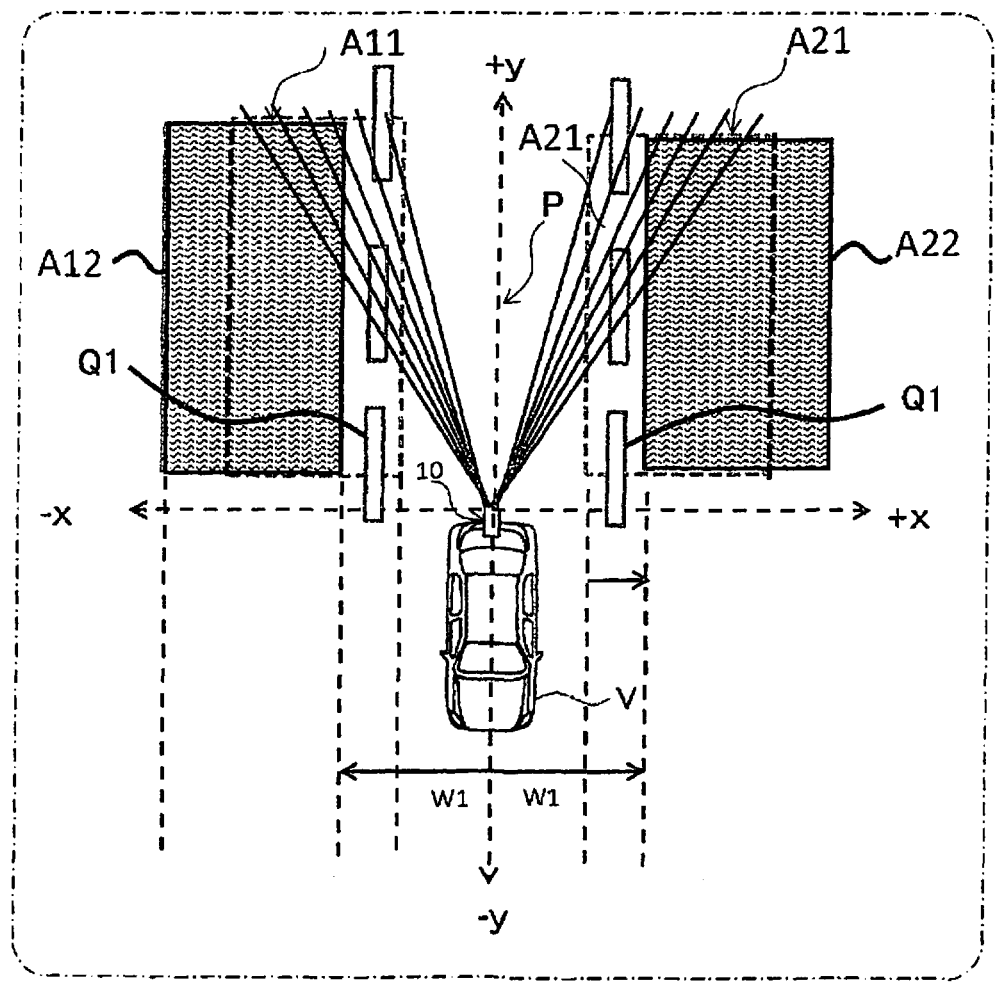
FIG. 23 is a view illustrating a first example of a second detection area.

As illustrated in FIG. 23, when the lens state assessment unit 38 determines that the lens 11 is in a wet state, the detection area setting unit 41 according to the present embodiment changes the first detection areas A11, A21, which are first set as detection areas A1, A2, to positions that are separate from a reference line P that passes the installation position of the camera 10 and that is along the vehicle length direction y of the host vehicle V by a first predetermined distance W1; the detection area setting unit then sets the second detection areas A12, A22 to the positions after changing them into the new detection areas A1, A2. By separating the first detection areas A11, A21 both to the left and right side of the center of the driving lane of the host vehicle V by a distance W1 in this manner, the configuration is such that the display area of the driving lane markers (the white lines) on the driving lane side of the host vehicle V among the driving lane markers in the adjacent lanes that are adjacent to the lane in which the vehicle drives will not be included in the second detection areas A12, A22; therefore, eliminating the effect of the distorted image of the white line captured by the wet lens 11 is possible. When another vehicle VX is present in the detection areas A1, A2, primarily, only the driving lane markers (the white lanes) on the driving lane side of the host vehicle V among the driving lane markers will be captured. Accordingly, in the present embodiment, the second detection areas A12, A22 are set by changing the positions so that they do not include (remove) a display area for the driving lane markers (the white lines) on the driving lane side of the host vehicle V among the driving lane markers in the adjacent lanes, which are adjacent to the lane in which the vehicle drives.

Figure 24:
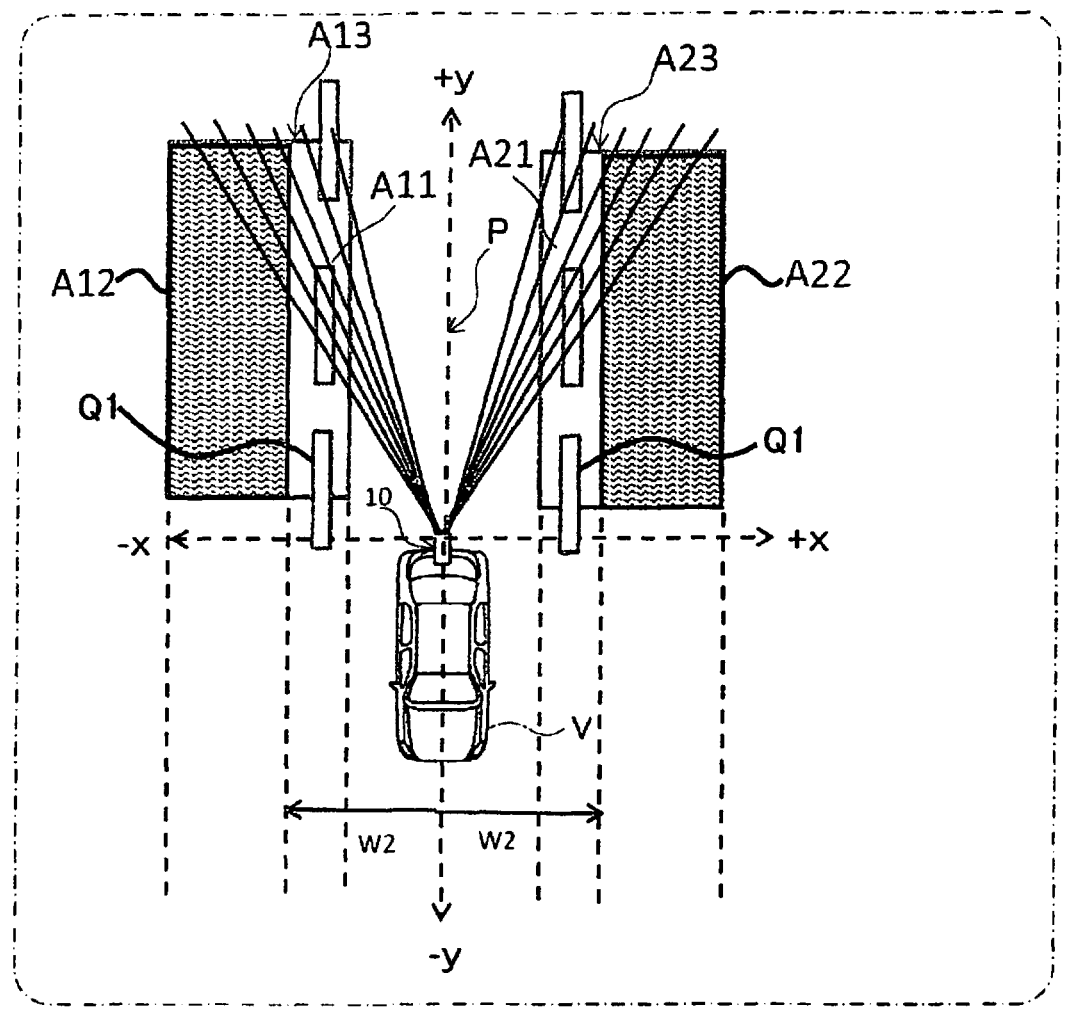
FIG. 24 is a view illustrating a second example of the second detection area.

As illustrated in FIG. 24, when the lens state assessment unit 38 determines that the lens 11 is in a wet state, the detection area setting unit 41 according to the present embodiment changes the positions of the second detection areas A12, A22 to areas within the first detection areas A11, A21, which are first set as the detection areas A1, A2, that are missing areas A13, A23, which are less than a second predetermined distance W2 from a reference line P that passes the installation position of the camera 10 and that is along the vehicle length direction y of the host vehicle V, and sets new detection areas A1, A2. By excluding from the detection areas the areas within the first detection areas A11, A21 that are both to the left and the right side of the center of the driving lane of the host vehicle V by less than a distance W2, the configuration is such so that the white lines (the driving lane markers) in the adjacent lanes will not be included in the second detection areas A12, A22; as a result, eliminating the effect of the distorted image of the white line captured by the wet lens 11 is possible.

Figure 25:
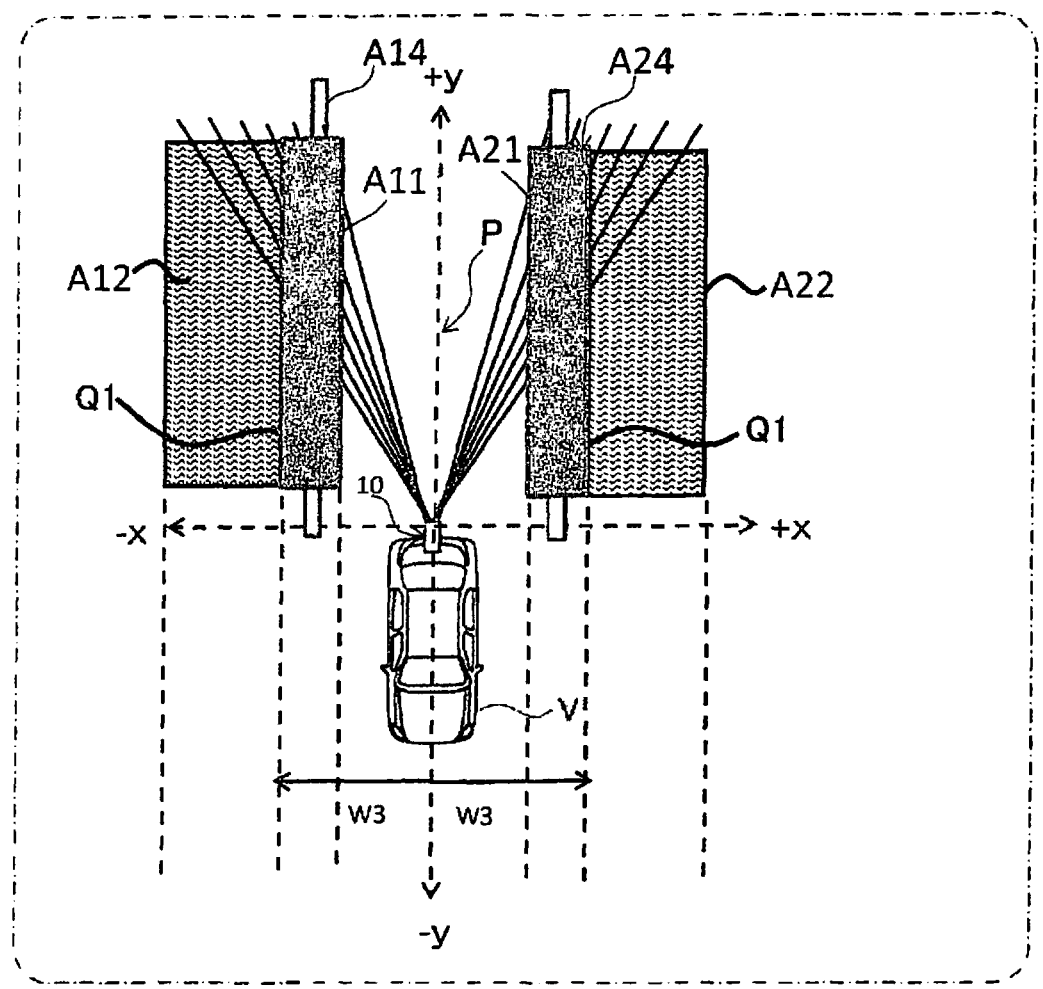
FIG. 25 is a view illustrating a third example of the second detection area.

As illustrated in FIG. 25, when the lens state assessment unit 38 determines that the lens 11 is in a wet state, the detection area setting unit 41 according to the present embodiment sets the second detection areas A12, A22, in which areas A14, A24 that are less than a third of a predetermined distance W3 from a reference line P that passes the installation position of the camera 10 and that is along the vehicle length direction y of the host vehicle V, are masked (removed) from the first detection areas A11, A21, which are first set as detection areas A1, A2, as the new detection areas A1, A2. With a configuration such that the areas within the first detection areas A11, A21 that are both to the left and the right side of the center of the driving lane of the host vehicle V by less than a distance W3 will not function as the detection areas (masking), the configuration is such that the white lines (the driving lane markers) in the adjacent lanes will not be detected in the second detection areas A12, A22; as a result, eliminating the effect of the distorted image of the white line captured by the wet lens 11 is possible.

The predetermined distances W1 to W4 may be set in advance and stored in the computer 30, or they may be stored in association with road information (position information) in the map information stored by the navigation device 70; the predetermined distances W1 to W4 that correspond to the road information to which the position information belongs may also be sequentially read, based on the position information detected by the GPS in the navigation device 70. The predetermined distances may be the same distance or different distances. When the white line (the driving lane width) is around 15 cm, the predetermined distances W1 to W4 may be around 25 cm-300 cm.

When a determination is made by the lens state assessment unit 38 that the lens 11 is in a wet state, the detection area setting unit 41 of the present embodiment detects the display area in which a white line (the driving lane marker) is displayed on the road, based on the image captured by the camera 10, and changes the positions of the first detection areas A11, A21, which are first set as the detection areas A1, A2, so that the display area is removed (so as not to include the display area), and sets the second detection areas A12, A22 as the new detection areas A1, A2. By removing the display area of the white line from the first detection areas A11, A21 in this manner, the configuration is such that the white lines (the driving lane markers) in the adjacent lanes will not be detected in the second detection areas A12, A22; therefore, eliminating the effect of the distorted image of the white line captured by the wet lens 11 is possible. The method for differentiating the white lines included on the road surface and extracting the regions that include the differentiated white lines is not particularly limited, and image processing methods known at the time of the application may be appropriately applied.

In a capturing environment in which the contrast of the white lines (the driving lane markers) is high, the tendency for a characteristic of an image of a three-dimensional object to be extracted from the image of the white line, which is a planar object, becomes high. In this type of situation, preferably, the configuration is such that the white line markers of the adjacent lanes are not included in the detection areas A1, A2. Accordingly, the detection area setting unit 41 according to the present embodiment calculates the contrast level of the white lines displayed on the road, based on the image captured by the camera 10, and sets the second detection areas A12, A22 as the new detection areas A1, A2 when the calculated contrast level of the white lines is at a predetermined threshold value or greater. In this manner, the second detection areas A12, A22 are set so that the white lines (the driving lane markers) in the adjacent lane are not detected when the contrast of the white lines (the driving lane markers) is high; therefore, eliminating the effect of the distorted image of the white line captured by the wet lens 11 is possible.

Figure 26:
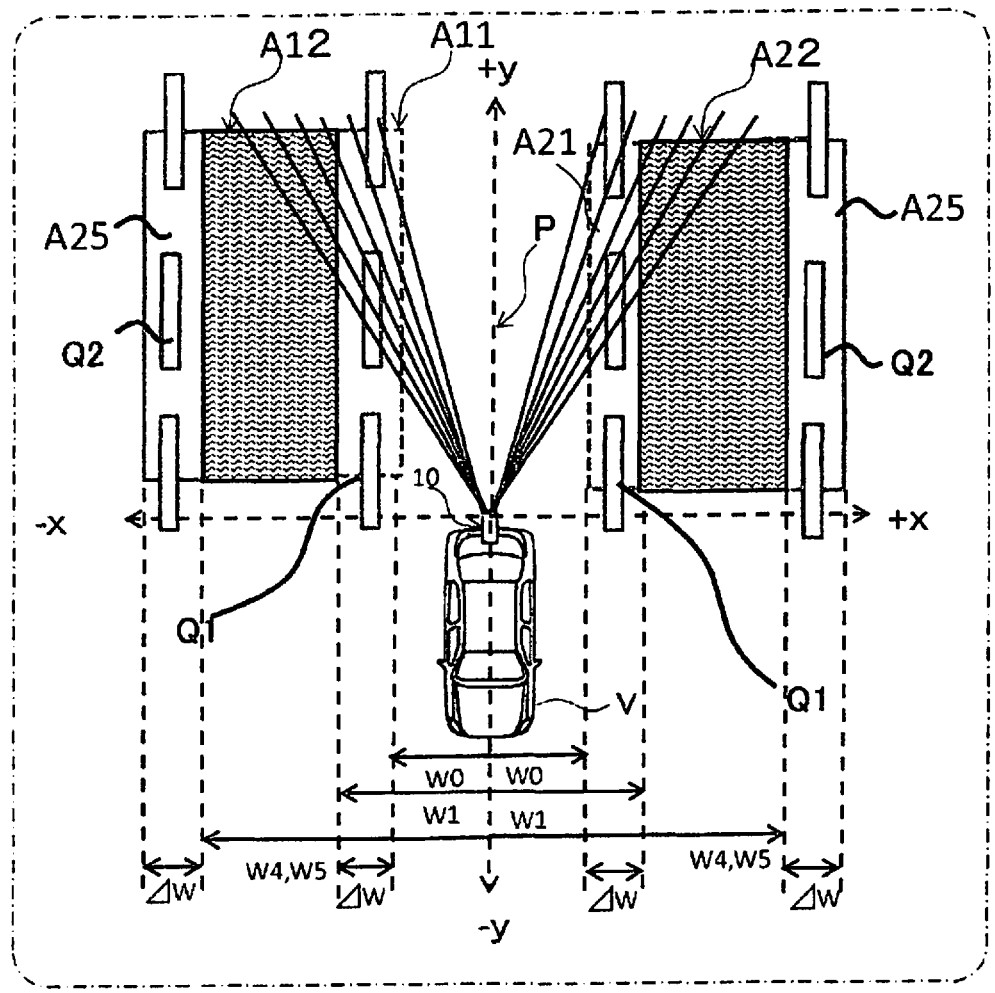
FIG. 26 is a view illustrating a fourth example of the second detection area.

Meanwhile, if the first detection areas A11, A21 are moved far outside of the reference line P based on the methods described above, there are cases in which the white lines (the driving lane markers) outside of the adjacent lanes are not included in the detection areas A1, A2, when another vehicle VX is not present in the detection area A1, A2. In this case, if the lens 11 is wet, there are cases in which the white lines outside of the adjacent lanes are distorted when captured, causing an erroneous detection. Accordingly, when a determination is made that the distance $\Delta W$ (W1−W0) between the second detection areas A12, A22 and the first detection areas A11, A21 is a predetermined value or greater, as illustrated in FIG. 26, the detection area setting unit 41 according to the present embodiment sets as the new detection areas A1, A2 the second detection areas A12, A22, in which area A25 that is separate from a reference line P that passes the installation position of the camera 10 and that is along the vehicle length direction y of the host vehicle V, by a fourth predetermined distance W4 or more, are removed from the set second detection areas A12, A22 by deletion or masking. In this manner, the second detection areas A12, A22 are set so that the white lines (the driving lane markers) outside of the adjacent lanes (farther from the driving lane of the host vehicle V) are not detected when the distance $\Delta W$ (W1−W0) between the second detection areas A12, A22 and the first detection areas A11, A21 is a predetermined value or greater; therefore, eliminating the effect of the distorted image of the white line captured by the wet lens 11 is possible.

The controller 39 of the three-dimensional object detection device 1 of the present embodiment will be described below. The controller 39 according to the present embodiment prevents a three-dimensional object detected by the three-dimensional object detection units 33, 37 from being determined to be another vehicle VX that is present in the right side detection area A1 or the left side detection area A2 by the three-dimensional object assessment unit 34 as the distance between the second detection areas A12, A22 and the first detection areas A11, A21 set by the detection area setting unit 41 becomes larger.

Since the default detection areas A1, A2 (the first detection areas A11, A21) are set in positions that can appropriately detect another vehicle VX during normal times, there are cases in which another vehicle VX is erroneously detected when the detection areas A1, A2 are changed and a three-dimensional object is detected using the same conditions and methods as usual. Accordingly, in the present embodiment, the threshold value relating to the difference in the pixel values when generating the differential waveform information is increased so that the detection of another vehicle VX is suppressed (so that detection is less likely), as the distance between the second detection areas A12, A22 and the first detection areas A11, A21 becomes larger.

Figure 27:
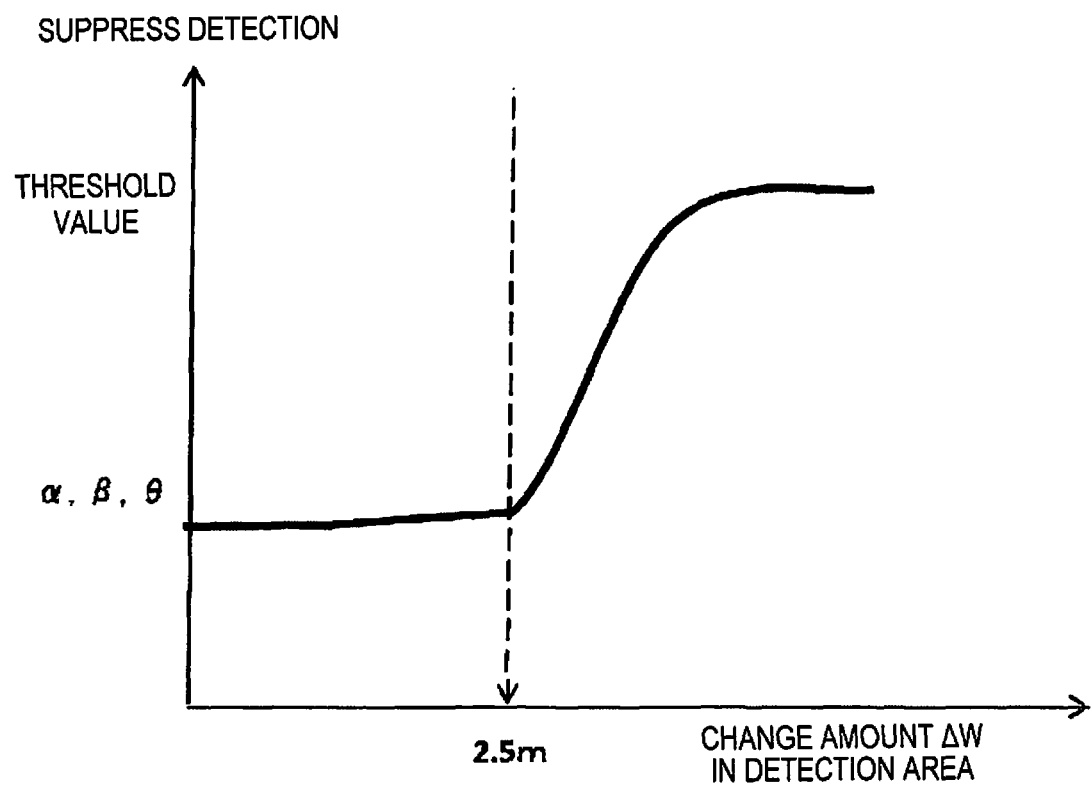
FIG. 27 is a view illustrating an example of the relationship between the misalignment amount of the detection area and the threshold value used for the detection of a three-dimensional object.

FIG. 27 illustrates an example of the relationship between each threshold value used for the operation for detecting another vehicle VX and the distance $\Delta W$ between the second detection areas A12, A22 and the first detection areas A11, A21. Each threshold value is set higher as $\Delta W$ increases, as illustrated in FIG. 27. In this manner, a three-dimensional object being detected and the detected three-dimensional object being determined to be another vehicle VX are suppressed as the distance $\Delta W$ (W1−W0) between the second detection areas A12, A22 and the first detection areas A11, A21 becomes larger; therefore, preventing an erroneous detection caused by shifting the detection areas A1, A2 is possible.

In addition, the controller 39 according to the present embodiment is able to output to a three-dimensional object detection unit 33 a control command for outputting a value obtained by counting the number of pixels that indicate a predetermined difference in the differential image of the bird's-eye view image and are formed into a frequency distribution, which is lower as the distance between the second detection areas A12, A22 and the first detection areas A11, A21 becomes larger. A value obtained by counting the number of pixels that indicate a predetermined difference in the differential image of the bird's-eye view image and are formed into a frequency distribution is a value on the vertical axis of the differential waveform DWt generated in Step S5 in FIG. 11. By lowering the output value in this manner, the detection sensitivity can be adjusted so that another vehicle VX that is driving adjacent to the driving lane of the host vehicle V is less likely to be detected, making the prevention of an erroneous detection of another vehicle VX possible.

Next, a control command used for detecting a three-dimensional object based on the edge information will be described. The controller 39 according to the present embodiment outputs to a three-dimensional object detection unit 37 a control command for increasing a predetermined threshold value related to luminance used when detecting the edge information as the distance between the second detection areas A12, A22 and the first detection areas A11, A21 becomes larger. A predetermined threshold value related to luminance used when detecting edge information is a threshold value θ for determining a value obtained by normalizing the sum of the continuity c of the attributes of each attention point Pa in Step S29 in FIG. 17; alternately, this is a second threshold value β for evaluating the quantity of edge lines in Step S34 in FIG. 18. By increasing the threshold value for determination in this manner, the detection sensitivity can be adjusted so that another vehicle VX that is driving adjacent to the driving lane of the host vehicle V is less likely to be detected, making the prevention of an erroneous detection of another vehicle VX possible.

Additionally, the controller 39 according to the present embodiment outputs to the three-dimensional object detection unit 37 a control command for outputting the quantity of the detected edge information which is lower as the distance between the second detection areas A12, A22 and the first detection areas A11, A21 becomes larger. The quantity of the detected edge information is the value obtained by normalizing the sum of the continuity c of the attributes of each attention point Pa in Step S29 in FIG. 17 or the quantity of edge lines in Step S34 in FIG. 18. By lowering the output value in this manner, the detection sensitivity can be adjusted so that another vehicle VX that is driving adjacent to the driving lane of the host vehicle V is less likely to be detected by making the output value smaller; therefore, preventing an erroneous detection of another vehicle VX that is driving in the adjacent lane is possible.

Accordingly, when a determination has been made that the distance ΔW (W1−W0) between the set second detection areas A12, A22 and the first detection areas A11, A21 is a predetermined value or greater, the detection area setting unit 38 according to the present embodiment changes the positions and sets a third detection area A25 in an area within the set second detection areas A12, A22 that is separate from a reference line P that passes the installation position of the camera 10 and that is along the vehicle length direction y of the host vehicle by a fifth predetermined distance W5 or more (incorporate FIG. 26). The controller 39 then prevents a three-dimensional object detected from information based on an image corresponding to this third detection area A25 from being determined to be another vehicle VX. Specifically, the controller detects a three-dimensional object based on an image corresponding to the third detection area A25 and increases the first threshold value α, the second threshold value β, and θ, which are applied in the process for determining whether or not the detected three-dimensional object is another vehicle VX.

In this manner, when the distance ΔW (W1−W0) between the second detection areas A12, A22 and the first detection areas A11, A21 is large, a three-dimensional object being detected from image information corresponding to an area that is separate from a reference line P along the vehicle length direction y of the vehicle by a fifth predetermined distance W5 or more and the detected three-dimensional object being determined to be another vehicle VX are suppressed; therefore, preventing an erroneous detection caused by shifting the detection areas A1, A2 is possible.

Figure 28:
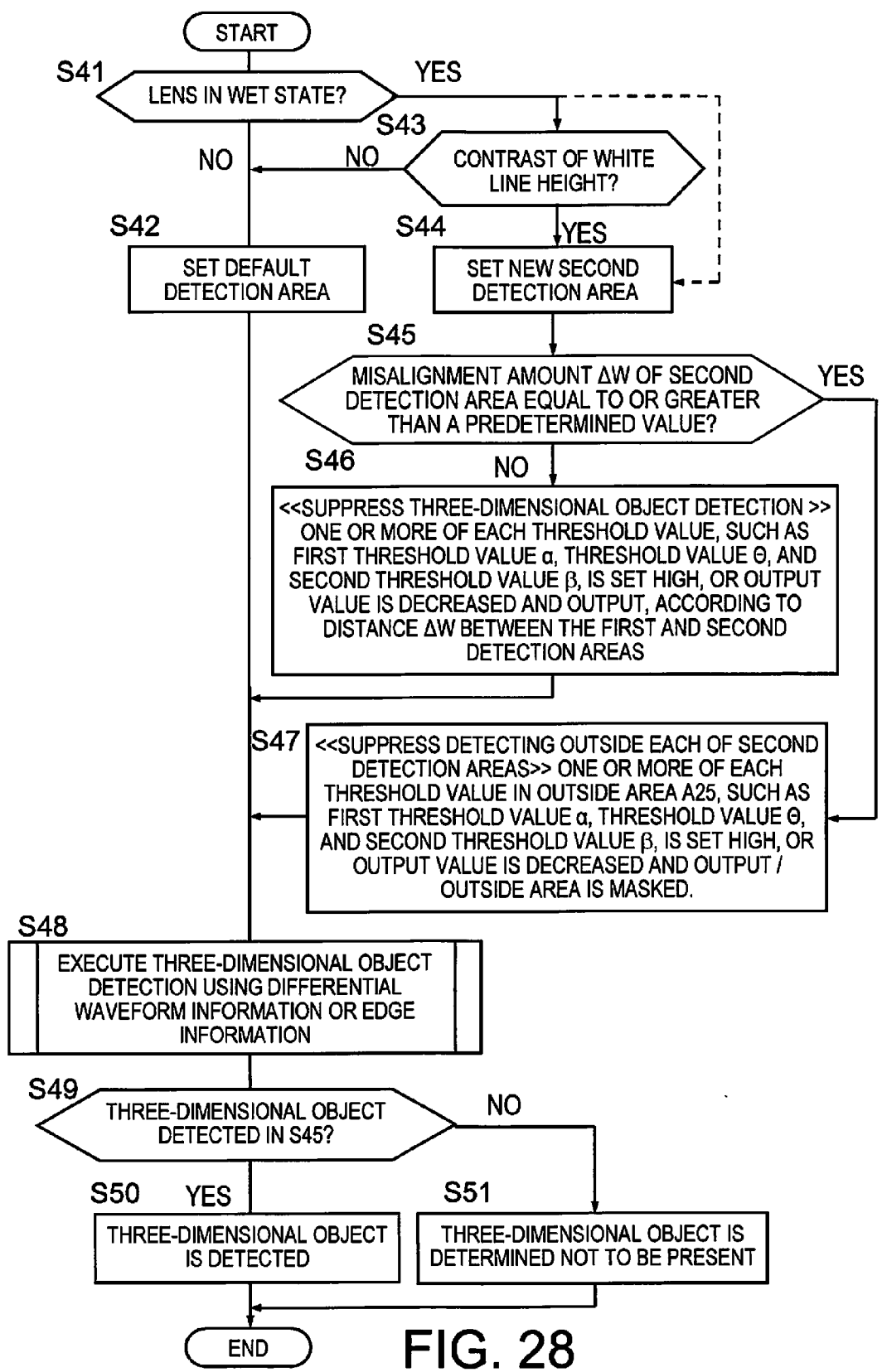
FIG. 28 is a flowchart of another example illustrating the control procedure of the three-dimensional object detection device of the present embodiment.

FIG. 28 is the control procedure for the three-dimensional object detection device 1 according to the present embodiment. The lens state assessment unit 38 assesses whether or not the lens 11 is in a wet state based on various information acquired from the raindrop sensor 50, the wiper 60, the navigation device 70, or the lens cleaning device 80 in Step S41. If the lens 11 is not in a wet state, the operation proceeds to Step S42 and sets the default first detection areas A11, A21 as the detection areas A1, A2. On the other hand, if the lens 11 is determined to be in a wet state, the operation proceeds to Step S43.

The detection area setting unit 41 determines whether the contrast, which is the luminance difference between the inside and outside of the edges of the image detected as a white line, is a predetermined value or more and proceeds to Step S42 if the contrast is less than the predetermined value, then, the default first detection areas A11, A21 are set as the detection areas A1, A2 in Step S43. On the other hand, the operation proceeds to Step S44 if the contrast is the predetermined value or more, and the new second detection areas A12, A22 with changed positions are set. The detection area setting unit 41 sets the new second detection areas A12, A22 using one of the plurality of methods for setting described above.

When the misalignment amount ΔW of the set positions of the new second detection areas A12, A22 in relation to the set positions of the default first detection areas A11, A21 is not a predetermined value or more, the operation proceeds to Step S46, and the controller 39 sets one of the threshold values, which are applied to the detection of three-dimensional objects and the determination regarding the presence of another vehicle, such as the first threshold value α, the threshold value θ, and the second threshold value β, higher as the misalignment amount ΔW becomes larger so as to suppress the detection of three-dimensional objects in Step S45. The threshold value is set to be high when processing the image information acquired from the new second detection areas A12, A22.

In Step S45, when the misalignment amount ΔW of the set positions of the new second detection areas A12, A22 in relation to the set positions of the default first detection areas A11, A21 is a predetermined value or more, the operation proceeds to Step S47, and the detection area setting unit 41 sets a third detection area A25, which is separate from a reference line P along the vehicle length direction y of the host vehicle V by a fifth predetermined distance W5 or more (refer to FIG. 26). The controller 39 then prevents a three-dimensional object from being detected as another vehicle VX from information based on an image corresponding to this third detection area A25. In other words, one of the threshold values, which are applied when processing the image corresponding to the third detection area A25, such as the first threshold value α, the threshold value θ, and the second threshold value β, is set to be high.

The controller 39 changes each of the threshold values used for each of the operations to be higher than the initial value, the standard value, and the other set values (so that detection will be less likely); alternately, the controller changes the output value that is compared with each of the threshold values to be lower (so that detection will be less likely) in order to prevent a three-dimensional object from being detected by the three-dimensional object detection units 33, 37 or a three-dimensional object from being determined to be another vehicle VX by the three-dimensional object assessment unit 34.

The specific contents of the operation are as follows.

When the three-dimensional object detection unit 33, which detects a three-dimensional object using differential waveform information, detects a three-dimensional object when the differential waveform information is at a predetermined first threshold value a or greater, the controller 39 generates a control command for increasing the first threshold value a so that the three-dimensional object is not readily detected and outputs this control command to the three-dimensional object detection unit 33.

Similarly, when the three-dimensional object detection unit 33 detects a three-dimensional object when the differential waveform information is at a predetermined first threshold value $\alpha$ or greater, the controller 39 generates a control command for decreasing and outputting a value obtained by counting the number of pixels that indicate a predetermined difference in the differential image of the bird's-eye view image and formed into a frequency distribution and outputs this control command to the three-dimensional object detection unit 38.

In addition, when the three-dimensional object detection unit 33, which detects a three-dimensional object using differential waveform information, extracts the number of pixels that indicate a pixel value at a threshold value p or greater as a number of pixels that indicate a predetermined difference, the controller 39 generates a control command for increasing the threshold value p so that the three-dimensional object is not readily detected and outputs this control command to the three-dimensional object detection unit 38.

Similarly, when the three-dimensional object detection unit 33 extracts the number of pixels that indicate a pixel value at a threshold value p or greater as a number of pixels that indicate a predetermined difference, the controller 39 generates a control command for decreasing and outputting the number of pixels that are extracted from the differential image along a direction in which a three-dimensional object collapses when the viewpoint is converted into a bird's-eye view image and outputs this control command to the three-dimensional object detection unit 38.

When the three-dimensional object detection unit 37, which detects a three-dimensional object using the edge information, extracts an edge line based on pixels that indicate a luminance difference of a predetermined threshold value t or more, the controller 39 generates a control command for increasing the predetermined threshold value t so that the three-dimensional object is not readily detected and outputs this control command to the three-dimensional object detection unit 37.

Similarly, when the three-dimensional object detection unit 37, which detects a three-dimensional object using the edge information, extracts an edge line based on pixels that indicate a luminance difference of a predetermined threshold value t or more, the controller 39 generates a control command for decreasing and outputting the luminance value of the pixels and outputs this control command to the three-dimensional object detection unit 37.

When the three-dimensional object detection unit 37, which detects a three-dimensional object using the edge information, detects a three-dimensional object based on an edge line having a length of a threshold value $\theta$ included in the edge information or more, the controller 39 generates a control command for increasing the threshold value $\theta$ so that the three-dimensional object is not readily detected and outputs this control command to the three-dimensional object detection unit 37.

Similarly, when the three-dimensional object detection unit 37, which detects a three-dimensional object using the edge information, detects a three-dimensional object based on an edge line having a length of a threshold value $\theta$ included in the edge information or more, the controller 39 generates a control command for decreasing and outputting the value of the length of the edge line of the detected edge information and outputs this control command to the three-dimensional object detection unit 37.

When the three-dimensional object detection unit 37, which detects a three-dimensional object using the edge information, detects a three-dimensional object based a determination regarding whether the number of edge lines that are a predetermined length or longer are included in the edge information, for example, the edge lines having a length of a threshold value $\theta$ or greater, is at a second threshold value $\beta$ or greater, the controller 39 generates a control command for increasing the second threshold value $\beta$ so that the three-dimensional object is not readily detected and outputs this control command to the three-dimensional object detection unit 37.

When the three-dimensional object detection unit 37, which detects a three-dimensional object using the edge information, detects a three-dimensional object based a determination regarding whether the number of edge lines that are a predetermined length or longer are included in the edge information, for example, the edge lines having a length of a threshold value $\theta$ or greater, is at a second threshold value $\beta$ or greater, the controller 39 generates a control command for decreasing and outputting the number of detected edge lines that are a predetermined length or longer and outputs this control command to the three-dimensional object detection unit 37.

In addition, when the traveling speed of the detected three-dimensional object is a predetermined speed that is set in advance or greater and the three-dimensional object assessment unit 34 determines that this three-dimensional object is another vehicle, the controller 39 generates a control command for increasing the predetermined speed, which becomes the lower limit when determining that a three-dimensional object is another vehicle, so that the three-dimensional object is not readily detected, and outputs this control command to the three-dimensional object assessment unit 34.

Similarly, when the traveling speed of the detected three-dimensional object is a predetermined speed that is set in advance or greater and the three-dimensional object assessment unit 34 determines that this three-dimensional object is another vehicle, the controller 39 generates a control command for decreasing and outputting the traveling speed of the three-dimensional object that is compared with the predetermined speed, which becomes the lower limit when determining that a three-dimensional object is another vehicle, and outputs this control command to the three-dimensional object assessment unit 34.

In addition, when the traveling speed of the detected three-dimensional object is less than a predetermined speed that is set in advance and the three-dimensional object assessment unit 34 determines that this three-dimensional object is another vehicle, the controller 39 generates a control command for decreasing the predetermined speed, which becomes the upper limit when determining that a three-dimensional object is another vehicle, and outputs this control command to the three-dimensional object assessment unit 34.

Similarly, when the traveling speed of the detected three-dimensional object is less than a predetermined speed that is set in advance and the three-dimensional object assessment unit 34 determines that this three-dimensional object is another vehicle, the controller 39 generates a control command for increasing the traveling speed of the three-dimensional object that is compared with the predetermined speed, which becomes the upper limit when determining that a three-dimensional object is another vehicle, and outputs this control command to the three-dimensional object assessment unit 34.

Here, the "traveling speed" includes the absolute speed of the three-dimensional object, as well as the relative speed of the three-dimensional object in relation to the host vehicle. The absolute speed of the three-dimensional object may be calculated from the relative speed of the three-dimensional object, or the relative speed of the three-dimensional object may be calculated from the absolute speed of the three-dimensional object.

The first threshold value α is a threshold value for determining the peak of the differential waveform DWt in Step S7 in FIG. 11. The threshold value p is a threshold value for extracting pixels having a predetermined pixel value. The predetermined threshold value t is a threshold value for extracting pixels or edge components that have a predetermined luminance difference. The threshold value θ is a threshold value for determining a value (the length of the edge) obtained by normalizing the sum of the continuity c of the attributes of each attention point Pa in Step S29 in FIG. 17; the second threshold value β is a threshold value for evaluating the quantity (the number) of edge lines in Step S34 in FIG. 18. By increasing the threshold value for determination in this manner, the detection sensitivity can be adjusted so that another vehicle VX that is driving adjacent to the driving lane of the host vehicle V is less likely to be detected, making the prevention of an erroneous detection of another vehicle VX possible.

The controller 39 according to the present embodiment outputs to the three-dimensional object detection unit 33 a control command for decreasing and outputting a value obtained by counting the number of pixels that indicate a predetermined difference in the differential image of the bird's-eye view image and that are formed into a frequency distribution. A value obtained by counting the number of pixels that indicate a predetermined difference in the differential image of the bird's-eye view image and that are formed into a frequency distribution is a value on the vertical axis of the differential waveform DWt generated in Step S5 in FIG. 11. In addition, the controller 39 according to the present embodiment outputs to the three-dimensional object detection unit 37 a control command for decreasing and outputting the detected edge information. The detected edge information is the length of the edge line, which is a value obtained by normalizing the sum of the continuity c of the attributes of each attention point Pa in Step S29 in FIG. 17, as well as the quantity of edge lines in Step S34 in FIG. 18. The controller 39 decreases the value obtained by normalizing the sum of the continuity c of the attributes of each attention point Pa or the quantity of the edge lines, so that a three-dimensional object is not readily detected in the subsequent process. By lowering the output value in this manner, the detection sensitivity can be adjusted so that another vehicle VX that is driving adjacent to the driving lane of the host vehicle V is less likely to be detected; therefore, preventing an erroneous detection of another vehicle VX that is driving in the adjacent lane is possible.

When the second detection areas A12, A22 are set and each of the threshold values are set, the operation proceeds to Step S48, and the operation for detecting a three-dimensional object is carried out. The operation for detecting the three-dimensional object is carried out by the three-dimensional object detection unit 33 in accordance with the operation using the differential waveform information in FIGS. 11 and 12 or by the three-dimensional object detection unit 37 with the operation that uses the edge information in FIGS. 17 and 18. Then, in Step S43, when a three-dimensional object is detected by the three-dimensional object detection units 33, 37 in the detection areas A1, A2, the operation proceeds to Step S49, and the detected three-dimensional object is determined to be another vehicle VX. On the other hand, when a three-dimensional object is not detected by the three-dimensional object detection units 33, 37 in the detection areas A1, A2, the operation proceeds to Step S51, and a determination is made that another vehicle VX is not present in the first detection areas A11, A21.

According to the three-dimensional object detection device 1 according to the present embodiment of the present invention that is configured to operate in the way described above, the following effect is obtained.

(1) According to the three-dimensional object detection device 1 of the present embodiment, the second detection areas A12, A22 are set in positions that are different from the default first detection areas A11, A21 when a wet state of the lens 11 has been detected. These second detection areas A12, A22 are set to positions that do not include a display area of a white line on the driving lane side of the host vehicle V among the white lines in the adjacent lanes, which are adjacent to the lane in which the host vehicle V drives; therefore, eliminating the effect of the distorted image of the white line captured by the wet lens 11 is possible. As a result, preventing a reduction in the precision of the detection results caused by the lens 11 becoming wet is possible, and providing a three-dimensional object detection device 1 that detects another vehicle that drives in an adjacent lane with a high degree of precision is possible. This effect is similarly obtained both when detecting another vehicle VX based on the differential waveform information and when detecting another vehicle VX based on the edge information.

(2) According to the three-dimensional object detection device 1 of the present embodiment, by separating the first detection areas A11, A21 both to the left side and the right side of the center of the driving lane of the host vehicle V by a distance W1, the configuration can be such that the white lines (the driving lane markers) in the adjacent lanes will not be included in the second detection areas A12, A22; as a result, eliminating the effect of the distorted image of the white line captured by the wet lens 11 is possible.

(3) According to the three-dimensional object detection device 1 of the present embodiment, by excluding from the detection areas the areas within the first detection areas A11, A21 that are both to the left side and the right side of the center of the driving lane of the host vehicle V by less than a distance W2, the configuration can be such that the white lines (the driving lane markers) in the adjacent lanes will not be included in the second detection areas A12, A22; therefore, eliminating the effect of the distorted image of the white line captured by the wet lens 11 is possible.

(4) According to the three-dimensional object detection device 1 of the present embodiment, by configuring this device so that the areas within the first detection areas A11, A21 that are both to the left and right side of the center of the driving lane of the host vehicle V by less than a distance W3 will not function as detection areas (masking), the configuration can be such that the white lines (the driving lane markers) in the adjacent lanes will not be detected in the second detection areas A12, A22; therefore, eliminating the effect of the distorted image of the white line captured by the wet lens 11 is possible.

(5) According to the three-dimensional object detection device 1 of the present embodiment, by removing the display area of the white line from the first detection areas A11, A21, the configuration can be such that the white lines (the driving lane markers) in the adjacent lanes will not be detected in the second detection areas A12, A22; as a result, eliminating the effect of the distorted image of the white line captured by the wet lens 11 is possible.

(6) In a situation in which the contrast of the white lines (the driving lane markers) is high, there is a high possibility that an erroneous detection will occur due to the distorted image of the white line. According to the three-dimensional object detection device 1 of the present embodiment, the second detection areas A12, A22 are set so that the white lines (the driving lane markers) in the adjacent lane are not detected when the contrast of the white lines (the driving lane markers) is high; therefore, eliminating the effect of the distorted image of the white line captured by the wet lens 11 is possible.

(7) According to the three-dimensional object detection device 1 of the present embodiment, the second detection areas A12, A22 are set so that the white lines (the driving lane markers) outside of the adjacent lanes (farther from the driving lane of the host vehicle V) are not detected when the distance ΔW (W1−W0) between the second detection areas A12, A22 and the first detection areas A11, A21 is a predetermined value or greater; as a result, eliminating the effect of the distorted image of the white line captured by the wet lens 11 is possible.

(8) According to the three-dimensional object detection device 1 of the present embodiment, a three-dimensional object being detected and the detected three-dimensional object being determined to be another vehicle VX are suppressed as the distance ΔW (W1−W0) between the second detection areas A12, A22 and the first detection areas A11, A21 becomes larger; therefore, preventing an erroneous detection caused by shifting the detection areas A1, A2 is possible.

(9) According to the three-dimensional object detection device 1 of the present embodiment, when the distance ΔW (W1−W0) between the second detection areas A12, A22 and the first detection areas A11, A21 is large, a three-dimensional object being detected from the image information corresponding to an area that is separate from a reference line P along the vehicle length direction y of the vehicle by a fifth predetermined distance W5 or more, as well as the detected three-dimensional object being determined to be another vehicle VX, are suppressed; as a result, preventing an erroneous detection caused by shifting the detection areas A1, A2 is possible.

The camera 10 described above corresponds to the capturing unit according to the present invention; the viewpoint conversion unit 31 described above corresponds to the image conversion means according to the present invention; the alignment unit 32 and the three-dimensional object detection unit 33 described above correspond to the three-dimensional object detection means according to the present invention; the luminance difference calculation unit 35, the edge line detection unit 36, and the three-dimensional object detection unit 37 described above correspond to the three-dimensional object detection means according to the present invention; the three-dimensional object assessment unit 34 described above corresponds to the three-dimensional object assessment means; the lens state assessment unit 38 described above corresponds to the lens state assessment means; the detection area setting unit 41 described above corresponds to the detection area setting means; and the vehicle speed sensor 20 described above corresponds to the speed sensor.

The alignment unit 21 in the present embodiment aligns in a bird's-eye view the positions of the bird's-eye view images obtained at different times and obtains the aligned bird's-eye view images; however, the "alignment" operation may be carried out at a precision corresponding to the type of objects to be detected or to the required precision for detection. The operation may be a strict alignment operation in which alignment is conducted based on the same time and the same position, or this operation may be a loose alignment operation in which the coordinates of each bird's-eye view image are grasped.

The invention claimed:

1. A three-dimensional object detection device comprising:
   an image capturing unit comprising a lens for capturing images behind a host vehicle;
   a lens state assessment unit programmed to determine whether or not the lens is in a wet state;
   a detection area setting unit programmed to set a first detection area if the lens is determined not to be in the wet state or a second detection area if the lens is determined to be in the wet state, the first detection area being an area behind the host vehicle within a capture range of the image capturing unit, the first detection area including a first driving lane marker disposed between the host vehicle and an adjacent lane located adjacent to a lane in which the host vehicle travels, the second detection area being obtained by changing a position of the first detection area such that the second detection area does not include the first driving lane marker; and
   a three-dimensional object detection unit programmed to detect a presence of a three-dimensional object in the set first detection area or the set second detection area based on the images acquired by the image capturing unit,
   the detection area setting unit being programmed to determine an offset distance by which the position of the first detection area was changed in a widthwise direction of the host vehicle to obtain the second detection area, and
   when a determination is made that the offset distance of the set second detection area with respect to the first detection area is a predetermined value or greater, the detection area setting unit modifies the set second detection area by deleting or masking a partial area within the set second detection area along the vehicle width direction of the host vehicle such that a second driving lane marker located farther from the host vehicle on an opposite side of the adjacent lane from the first driving lane marker is not included in the modified second detection area.

2. The three-dimensional object detection device according to claim 1, wherein
   the detection area setting unit calculates a contrast level of the first driving lane marker based on the image captured by the camera, and sets the second detection area when the lens is in the wet state and the calculated contrast level of the first driving lane marker is at a predetermined threshold value or greater.

3. The three-dimensional object detection device according to claim 1, further comprising a three-dimensional object assessment unit programmed to determine if a three-dimensional object detected by the three-dimensional object detecting unit is another vehicle; and a controller programmed to suppress determination by the three-dimensional object assessment unit that the three-dimensional object detected by the three-dimensional object detection unit is another vehicle such that determination that the detected three-dimensional object is another vehicle becomes less likely as the offset distance becomes larger.

4. The three-dimensional object detection device according to claim 1, further comprising a three-dimensional object assessment unit programmed to determine if a three-dimensional object detected by the three-dimensional object detecting unit is another vehicle; and a controller, the detection area setting unit being programmed such that when a determination is made that the offset distance of the set second detection area with respect to the first detection area is equal to or larger than the predetermined value, the detection area setting unit sets a third detection area in an area within the set second detection area that is separated from the host vehicle along the vehicle width direction of the host vehicle by a predetermined distance or more; and the controller being programmed to prevent the three-dimensional object assessment unit from determining that the three-dimensional object detected by the three-dimensional object detecting unit is another vehicle based on image information corresponding to the third detection area.

5. The three-dimensional object detection device according to claim 1, wherein the lens state assessment unit is further programmed to determine whether or not the lens is in a wet state based on information acquired from one or more of a raindrop sensor, a wiper, a navigation device, or a cleaning device for the lens mounted on the host vehicle.

6. The three-dimensional object detection device according to claim 1, further comprising:

an image conversion unit programmed to convert a viewpoint of the images obtained by the image capturing unit into bird's-eye view images; and a three-dimensional object assessment unit programmed determine whether or not a three-dimensional object detected by the three-dimensional object assessment unit is another vehicle;

the detection area setting unit being programmed to set the first detection area or the second detection area on both a right side and a left side behind the host vehicle;

the three-dimensional object detection unit being programmed to detect a presence of the three-dimensional object in the set first detection area or the set second detection area based on differential waveform information by aligning in bird's-eye view positions of the bird's-eye view images obtained at different times by the image conversion unit, and generating the differential waveform information by counting a number of pixels that indicate a predetermined difference on a difference image along a direction in which the three-dimensional object collapses when the viewpoint of the bird's-eye view images is converted into the difference image of the aligned bird's-eye view images to create a frequency distribution; and the three-dimensional object assessment unit being programmed to determine whether or not the three-dimensional object detected by the three-dimensional object detection unit is another vehicle that is present in the set first detection area or the set second detection area on the right side or the left side of the host vehicle.

7. The three-dimensional object detection device according to claim 1, further comprising:

an image conversion unit programmed to convert a viewpoint of the images obtained by the image capturing unit into a bird's-eye view image; and a three-dimensional object assessment unit programmed determine whether or not a three-dimensional object detected by the three-dimensional object assessment unit is another vehicle;

the detection area setting unit being programmed to set the first detection area or the second detection area on each of a right side and a left side behind the host vehicle;

the three-dimensional object detection unit being programmed to detect edge information indicating that there is a luminance difference of mutually adjacent image areas at a predetermined threshold value or greater along a direction in which a three-dimensional object collapses when the viewpoint is converted into the bird's-eye view image that was obtained by the image conversion unit, and the three-dimensional object detection unit being programmed to detect a presence of the three-dimensional object based on the edge information; and the three-dimensional object assessment unit being programmed to determine whether or not the three-dimensional object detected by the three-dimensional object detection unit is another vehicle that is present in the set first detection area or the set second detection area on the right side or the left side of the host vehicle.

8. A three-dimensional object detection device comprising:

a computer configured to be mounted on a host vehicle, and programmed to execute:

a step for converting the viewpoint of images obtained by an image capturing unit mounted on the host vehicle, and the image capturing unit comprising a lens for capturing the images of behind the host vehicle to create bird's-eye view images;

a step for detecting whether or not the lens is in a wet state;

a step for setting a first detection area on both a right side and a left side behind the host vehicle if the lens is not in the wet state or a second detection area on each of a right side and a left side behind the host vehicle if the lens is in the wet state, the first detection area including a first driving lane marker disposed between the host vehicle and an adjacent lane located adjacent to a lane in which the host vehicle travels, the second detection area being obtained by changing a position of the first detection area in a vehicle width direction such that the second detection area does not include the first driving lane marker;

a step for determining an offset distance by which the position of the first detection area was changed in a widthwise direction of the host vehicle to obtain the second detection area, and a step for determining if the offset distance of the set second detection area with respect to the first detection area is a predetermined value or greater;

a step for modifying the set second detection area by deleting or masking a partial area within the set second detection area along the vehicle width direction of the host vehicle such that a second driving lane marker located farther from the host vehicle on an opposite side of the adjacent lane from the first driving lane marker is not included in the modified second detection area if the offset distance is equal to or larger than the predetermined value;

a step for detecting a three-dimensional object that is present in the set first detection area or the set second detection area based on a differential waveform information by aligning positions of the bird's-eye view images obtained at different times in a bird's-eye view, generating the differential waveform information by counting a number of pixels that indicate a predetermined difference on a difference image along a direction in which a three-dimensional object collapses when the viewpoint of the bird's-eye view images is converted into the difference image of the aligned bird's-eye view images, and forming a frequency distribution; and a step for determining whether or not the detected three-dimensional object is another vehicle that is present in the set first detection area or the set second detection area on the right side or the left side of the host vehicle.

9. A three-dimensional object detection device, comprising:

a computer configured to be mounted on a host vehicle, and programmed to execute:

a step for converting the viewpoint of an image obtained by an image capturing unit mounted on the host vehicle, and the image capturing unit comprising a lens for capturing the images of behind the host vehicle to create a bird's-eye view image;

a step for detecting whether or not the lens is in a wet state;

a step for setting a first detection area on both a right side and a left side behind the host vehicle if the lens is not in the wet state or a second detection area on each of a right side and a left side behind the host vehicle if the lens is in the wet state, the first detection area including a first driving lane marker disposed between the host vehicle and an adjacent lane located adjacent to a lane in which the host vehicle travels, the second detection area being obtained by changing a position of the first detection area in a vehicle width direction such that the second detection area does not include the first driving lane marker;

a step for determining an offset distance by which the position of the first detection area was changed in a widthwise direction of the host vehicle to obtain the second detection area, and a step for determining if the offset distance of the set second detection area with respect to the first detection area is a predetermined value or greater;

a step for modifying the set second detection area by deleting or masking a partial area within the set second detection area along the vehicle width direction of the host vehicle such that a second driving lane marker located farther from the host vehicle on an opposite side of the adjacent lane from the first driving lane marker is not included in the modified second detection area if the offset distance is equal to or larger than the predetermined value;

a step for detecting the edge information, in which a luminance difference of mutually adjacent image areas are at a predetermined threshold value or greater along a direction in which a three-dimensional object collapses when the viewpoint is converted into the bird's-eye view image obtained by the image conversion unit, and detecting the three-dimensional object based on the edge information; and a step for determining whether or not the detected three-dimensional object is another vehicle that is present in the set first detection area or the set second detection area on the right side or the left side of the host vehicle.

* * * * *